(12) United States Patent
Kim et al.

(10) Patent No.: US 7,933,312 B2
(45) Date of Patent: Apr. 26, 2011

(54) METHOD AND SYSTEM FOR RECONFIGURABLE SFBC/STBC IN A DIVERSITY TRANSMISSION SYSTEM

(75) Inventors: Joonsuk Kim, San Jose, CA (US); Sirikiat Ariyavisitakul, Alpharetta, GA (US)

(73) Assignee: Broadcom Corporation, Irvine, CA (US)

( * ) Notice: Subject to any disclaimer, the term of this patent is extended or adjusted under 35 U.S.C. 154(b) by 928 days.

(21) Appl. No.: 11/769,481

(22) Filed: Jun. 27, 2007

(65) Prior Publication Data

US 2008/0253478 A1 Oct. 16, 2008

Related U.S. Application Data

(60) Provisional application No. 60/912,126, filed on Apr. 16, 2007.

(51) Int. Cl.
*H04B 1/00* (2006.01)

(52) U.S. Cl. ........ 375/146; 375/267; 375/299; 370/437; 370/465; 455/101; 455/115.1; 455/123

(58) Field of Classification Search .......... 375/140, 375/141, 146, 216, 220, 222, 267, 285, 295, 375/299; 370/278, 282, 437, 465, 478–480; 455/101, 115.1, 121, 123, 127.1
See application file for complete search history.

(56) References Cited

U.S. PATENT DOCUMENTS

| 7,308,018 | B2 * | 12/2007 | Seeger et al. | 375/141 |
| 2007/0183380 | A1 * | 8/2007 | Rensburg et al. | 370/338 |
| 2008/0069054 | A1 * | 3/2008 | Ho et al. | 370/335 |
| 2009/0129501 | A1 * | 5/2009 | Mehta et al. | 375/299 |
| 2009/0129502 | A1 * | 5/2009 | Tong et al. | 375/299 |

OTHER PUBLICATIONS

A. Naguib, N. Seshadri, A.R. Calderbank, Increasing Data Rate Over Wireless Channels, IEEE Signal Processing Magazine, May 2000.
V. Tarokh, H. Jafarkhani, A.R. Calderbank, Space-Time Block Codes from Orthogonal Designs, IEEE Transaction on Information Theory, vol. 45, No. 5, Jul. 1999.
H. Jafarkhani, A Quasi-Orthogonal Space-Time Block Code, IEEE Transactions on Communications, vol. 49, No. 1, Jan. 2001.

* cited by examiner

*Primary Examiner* — Dac V Ha
(74) *Attorney, Agent, or Firm* — McAndrews, Held & Malloy, Ltd.

(57) ABSTRACT

Aspects of a method and system for reconfigurable SFBC/STBC in a diversity transmission system are presented. Exemplary aspects of the system may include one or more circuits that enable generation of a plurality of codeword sequences based on a data sequence. In a diversity transmission system, the plurality of codeword sequences may be concurrently transmitted via at least a portion of a plurality of transmitting antennas. The concurrently transmitted codeword sequences may enable a diversity receiver to generate the data sequence. In a single input single output transmission system, one or more circuits may enable transmission of one of the plurality of codeword sequences via one of the plurality of transmitting antennas. The transmitted codeword sequence may enable a receiver to generate the data sequence.

21 Claims, 13 Drawing Sheets

METHOD AND SYSTEM FOR RECONFIGURABLE SFBC/STBC IN A DIVERSITY TRANSMISSION SYSTEM

CROSS-REFERENCE TO RELATED APPLICATIONS/INCORPORATION BY REFERENCE

This application makes reference to, claims priority to, and claims the benefit of U.S. Provisional Application Ser. No. 60/912,126 filed Apr. 16, 2007.

This application makes reference to U.S. patent application Ser. No. 11/759,203 filed Jun. 6, 2007.

Each of the above stated applications is hereby incorporated herein by reference in its entirety.

FIELD OF THE INVENTION

Certain embodiments of the invention relate to data communication. More specifically, certain embodiments of the invention relate to a method and system for reconfigurable SFBC/STBC in a diversity transmission system.

BACKGROUND OF THE INVENTION

Many legacy devices used for wireless communications are based on single input single output (SISO) technology. In a SISO communications system, a transmitting device utilizes a single antenna to transmit signals via a wireless communications medium and a receiving device utilizes a single antenna to receive the signals. A communication device capable of transmitting and receiving signals may utilize a single antenna for both transmission and reception of signals. Signals travel between the transmitting device and the receiving device over a propagation path.

In actual wireless communications, signal energy from a transmitted signal may be dispersed among a plurality of distinct propagation paths. The plurality of distinct propagation paths is referred to as a multipath. Each of the signals that follow a distinct propagation path may be referred to as a multipath signal. Along the propagation path from the transmitting device to the receiving device, each multipath signal may experience reflections due to physical obstacles encountered along the propagation path. The reflections may alter the amplitude and/or phase of the transmitted signals. The amplitude and/or phase of the transmitted signals may also be altered as the signals travel through the air. The modifications of the transmitted signals as they travel along the propagation path from the transmitting device to the receiving device are referred to as signal fading. In a SISO communications system, the signal fading characteristic may be represented by a transfer function coefficient, h.

Multipaths frequently impair communication between wireless devices. For example, the impairments may be observed as "drop outs" during voice communications, or may be observed through reduced data transfer rates and/or increased bit error rates (BER) during data communications. The impairments may also be evaluated based on signal to noise (SNR) measurements on the received signals. Overcoming multipath impairments may require wireless devices to transmit signals with higher radiated power levels, but this may reduce the operating cycle time for portable wireless devices before the batteries must be recharged.

Diversity transmission systems enable blocks of data to be transmitted via multiple transmitting antennas. By utilizing multiple transmitting antennas at the transmitting device, each of the transmitting signals may follow a distinct propagation path. A process of generating signals for transmission in a diversity transmission system is referred to as diversity coding.

Quasi-orthogonal space time block coding (STBC) is a method utilized in some diversity transmission systems utilized in the field of wireless communication. The appeal of quasi-orthogonal STBC is that it seeks to enable wireless communication systems to utilize advantages of diversity transmission at a transmitting station, while allowing simplified decoding techniques at a receiving station. The process of decoding diversity transmission signals at a receiving station is often referred to as diversity reception.

Diversity transmission systems are described by the number of transmitting antennas and the number of data streams. For example, a diversity transmission system, which utilizes four transmitting antennas to transmit data from a single data stream, may be referred to as a 4×1 diversity transmission system. The data stream may comprise a sequence of data symbols referred to as data symbols. With quasi-orthogonal STBC, each of the plurality of transmitting antennas may transmit one of the data symbols, or a permutated version of the data symbols, at a given time instant. Each of the data symbols may be referred to as a codeword. A single codeword may be represented s(i,k), where i represents an index to a transmitting antenna, and k represents a time index to the data symbol within the data stream. For example, s(0,0) may represent a first data symbol within a data stream that is transmitted from a first transmitting antenna while s(1,1) may represent a second data symbol within the data stream that is transmitted by the second transmitting antenna, s(2,2) may represent a third data symbol within the data stream that is transmitted by the third transmitting antenna and s(3,3) may represent a fourth data symbol within the data stream that is transmitted by the fourth transmitting antenna. Thus, with STBC, at a given time instant, each of the transmitting antennas may transmit a data symbol that occurs at a distinct time instant within the data stream.

A variation of STBC is space frequency block coding (SFBC). With SFBC, codewords are formed by selecting frequency carriers, or tones, which contain portions of data carried in a data symbol. With SFBC diversity transmission, at a given time instant, each of the transmitting antennas may transmit a codeword, or permutated version of a codeword, which comprises a portion of the data contained within a given data symbol. Collectively, the plurality of transmitting antennas may simultaneously transmit codewords, which may be combined to reconstruct the data symbol. A single SFBC codeword may be represented by s(i,k), where i represents an index to a transmitting antenna, and k represents a group of tones. For example, s(0,0) may represent a codeword that comprises tones 0, 4, 8 and 16 within a data symbol, which is transmitted by a first transmitting antenna, while s(1,1) may represent a codeword that comprises tones 1, 5, 9 and 17 within the data symbol, which is transmitted by a second transmitting antenna, s(2,2) may represent a codeword that comprises tones 2, 6, 10 and 18 within the data symbol, which is transmitted by a third transmitting antenna and s(3,3) may represent a codeword that comprises tones 3, 7, 11 and 19 within the data symbol, which is transmitted by a fourth transmitting antenna. A single transmitted codeword may comprise a plurality of tones represented by the tone group index, k.

In the case of diversity transmission, with either STBC or SFBC, each of the signals transmitted by each of the plurality of transmitting antennas may experience differing amounts of fading as the signals travel through the communication medium. This variable fading characteristic may be represented by a transfer function matrix, H, which comprises a plurality of transfer function coefficients, $h_{ij}$, that represent the differing fading characteristics experienced by the transmitted signals.

The ability to select specific multipath signals, or to combine a plurality of multipath signals in a diversity reception system, may enable a receiving device to receive signals with higher SNRs and to overcome impairments that may limit communications between wireless devices, which utilize SISO technology, without requiring that the transmitting device increase radiated power levels for transmitted signals. The improvement of diversity transmission systems relative to SISO systems may be measured by diversity gain calculations.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for reconfigurable SFBC/STBC in a diversity transmission system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for reconfigurable SFBC/STBC in a diversity transmission system. Various embodiments of the invention may comprise a method and system by which a diversity transmission system may be configured to communicate with a diversity reception system, or with a single input single output (SISO) receiving device. In various embodiments of the invention, the diversity transmission system may be enabled to communicate with the SISO receiving device by transmitting signals from a signal transmitting antenna. The diversity transmission system may be enabled to communicate with the diversity reception system by enabling transmission of signals via one or more additional transmitting antennas. In the single antenna configuration, the diversity transmission system may communicate signals encoded for SISO reception. In the multiple antenna diversity transmission configuration, the signals transmitted by the additional transmitting antennas, when combined with the SISO encoded signals, may result in diversity encoded signals. In an exemplary embodiment of the invention, the diversity transmission system may utilize quasi-orthogonal SFBC or STBC.

In another aspect of the invention, the diversity transmission system may be configured for a plurality of diversity transmission configurations. For example, in a diversity transmission system with four transmitting antennas, the diversity transmission system may be configured as a 4×1 diversity transmission system, a 3×1 diversity transmission system, a 2×1 diversity transmission system, or as a 2×4 diversity transmission system. In various embodiments of the invention, the various diversity transmission configurations may be accommodated at the diversity transmission device by utilizing one or more instances of a single diversity encoder module. This may result in simplified circuit design by obviating the design of customized diversity encoder modules for each diversity transmission system configuration.

Figure 1:
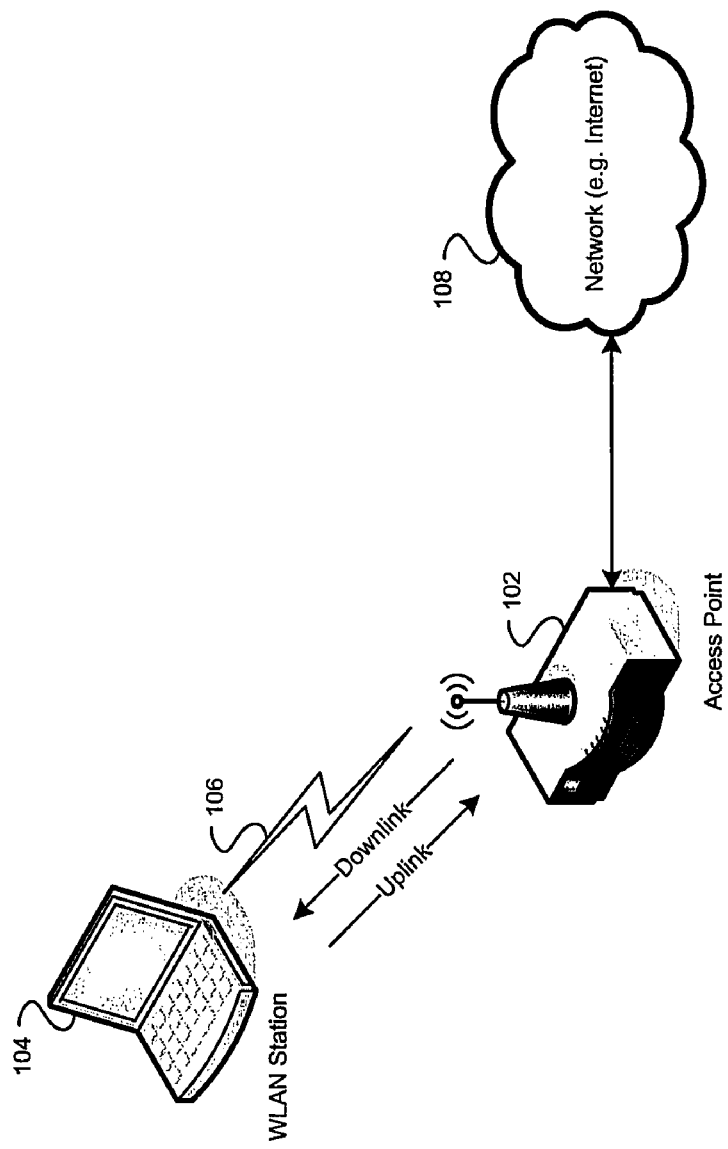
FIG. 1 is an exemplary wireless communication system, which may be utilized in connection with an embodiment of the invention.

FIG. 1 is an exemplary wireless communication system, which may be utilized in connection with an embodiment of the invention. Referring to FIG. 1, there is shown an access point (AP) 102, a wireless local area network (WLAN) station (STA) 104, an a network 108 (for example, the Internet). The AP 102 and the STA 104 may communicate wirelessly via one or more radio frequency (RF) channels 106. The AP may be communicatively coupled to the network 108. The AP 102, STA 104 and network 108 may enable communication based on one or more IEEE 802 standards, for example IEEE 802.11.

The STA 104 may utilize the RF channel 106 to communicate with the AP 102 by transmitting signals via an uplink channel. The transmitted uplink channel signals may comprise one or more frequencies associated with a channel as determined by a relevant standard, such as IEEE 802.11. The STA 104 may utilize the RF channel 106 to receive signals from the AP 102 via a downlink channel. Similarly, the received downlink channel signals may comprise one of more frequencies associated with a channel as determined by a relevant standard, such as IEEE 802.11.

The STA 104 and AP 102 may communicate via time division duplex (TDD) communications and/or via frequency division duplex communications. With TDD communications, the STA 104 may utilize the RF channel 106 to communicate with the AP 102 at a current time instant while the AP 102 may communicate with the STA 104 via the RF channel 106 at a different time instant. With TDD communications, the set of frequencies utilized in the downlink channel may be substantially similar to the set of frequencies utilized in the uplink channel. With FDD communications, the STA 104 may utilize the RF channel 106 to communicate with the AP 102 at the same time instant at which the AP 102 utilizes the RF channel 106 to communicate with the STA 104. With FDD communications, the set of frequencies utilized in the downlink channel may be different from the set of frequencies utilized in the uplink channel.

Figure 2:
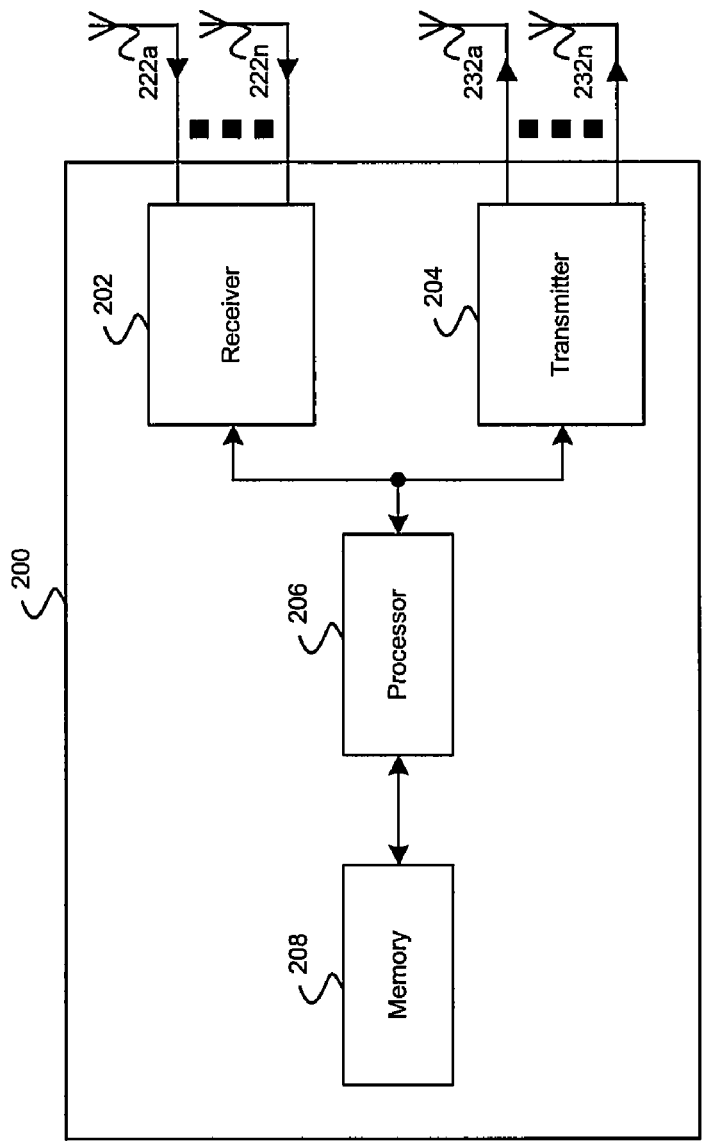
FIG. 2 is an exemplary transceiver, which may be utilized in connection with an embodiment of the invention.

FIG. 2 is an exemplary transceiver, which may be utilized in connection with an embodiment of the invention. Referring to FIG. 2, there is shown a transceiver system 200, a plurality of receiving antennas 222a . . . 222n and a plurality of transmitting antennas 232a . . . 232n. The transceiver system 200 may comprise at least a receiver 202, a transmitter 204, a processor 206, and a memory 208. Although a transceiver is shown in FIG. 2, transmit and receive functions may be separately implemented.

In accordance with an embodiment of the invention, the processor 206 may enable digital receiver and/or transmitter functions in accordance with applicable communications standards. In addition, the processor 206 may enable configuration of the transceiver system 200 for diversity transmission or SISO transmission. The processor 206 may also perform various processing tasks on received data. The processing tasks may comprise computing channel estimates, which may characterize the wireless communication medium, delineating packet boundaries in received data, and computing packet error rate statistics indicative of the presence or absence of detected bit errors in received packets.

The receiver 202 may perform receiver functions that may comprise, but are not limited to, the amplification of received RF signals, generation of frequency carrier signals corresponding to selected RF channels, for example uplink channels, the down-conversion of the amplified RF signals by the generated frequency carrier signals, demodulation of data contained in data symbols based on application of a selected demodulation type, and detection of data contained in the demodulated signals. The RF signals may be received via one or more receiving antennas 222a . . . 222n. The data may be communicated to the processor 206.

The transmitter 204 may perform transmitter functions that may comprise, but are not limited to, modulation of received data to generated data symbols based on application of a selected modulation type, generation of frequency carrier signals corresponding to selected RF channels, for example downlink channels, the up-conversion of the data symbols by the generated frequency carrier signals, and the generation and amplification of RF signals. The data may be received from the processor 206. The RF signals may be transmitted via one or more transmitting antennas 232a . . . 232n.

The memory 208 may comprise suitable logic, circuitry and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM). In the context of the present application, the memory 208 may enable storage of code for the configuration of the transceiver system 200 for diversity transmission or SISO transmission, for example.

Figure 3:
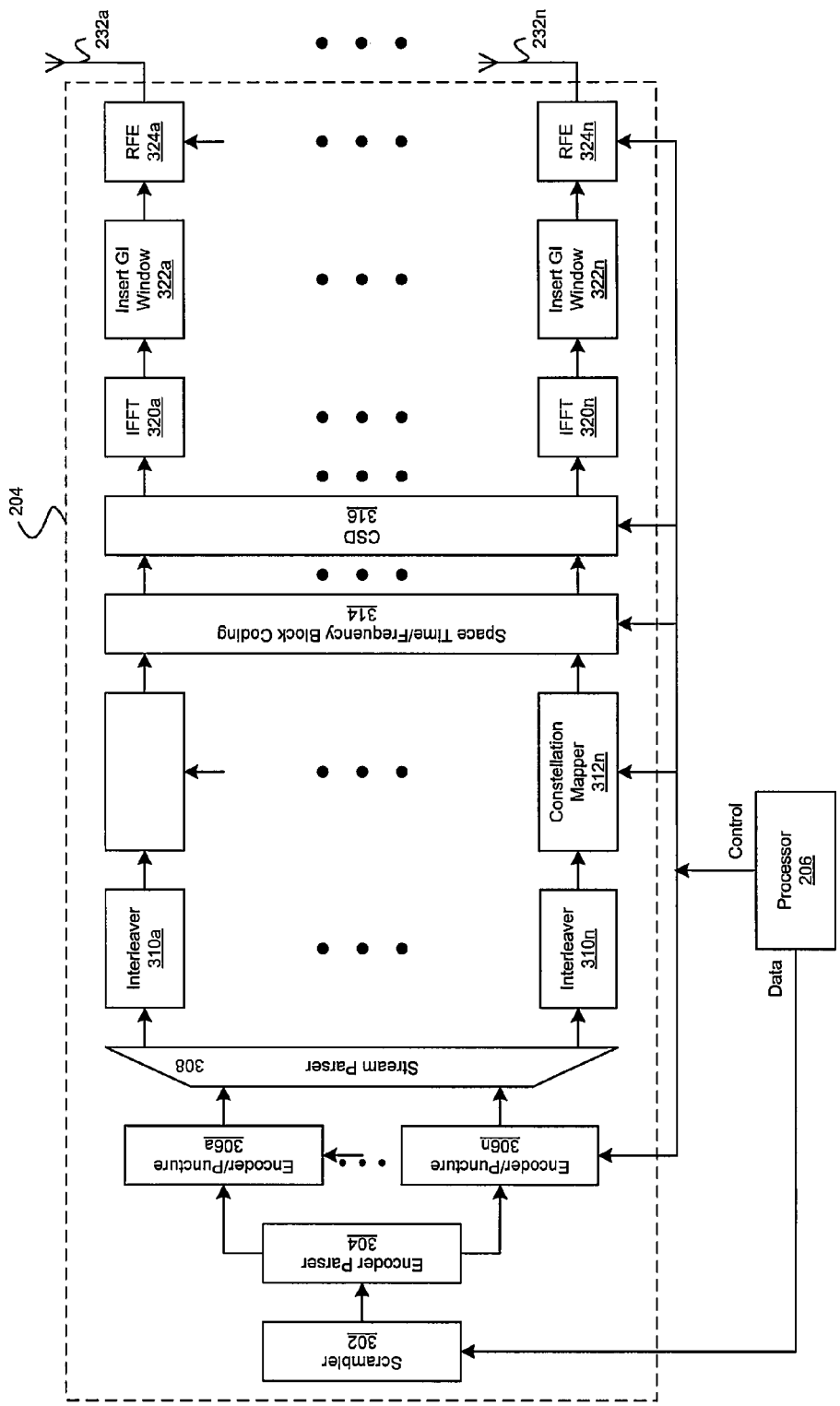
FIG. 3 is an exemplary block diagram of a transmitter, which may be utilized in connection with an embodiment of the invention.

FIG. 3 is an exemplary block diagram of a transmitter, which may be utilized in connection with an embodiment of the invention. Referring to FIG. 3, there is shown a transmitter 204, a processor 206 and a plurality of transmitting antennas 232a, . . . and 232n. The transmitter 204 may comprise a scrambler 302, an encoder parser 304, a plurality of encoder and puncture (encoder/puncture) blocks 306a, . . . , and 306n, a stream parser 308, a plurality of interleaver blocks 310a, . . . , and 310n, a plurality of constellation mapper blocks 312a, . . . , and 312n, a space time/frequency block coding (STBC/SFBC) block 314, a cyclical shift diversity (CSD) block 316, a plurality of inverse fast Fourier transform (IFFT) blocks 320a, . . . , and 320n, a plurality of insert guard interval window blocks 322a, . . . , and 322n, and a plurality of radio front end (RFE) blocks 324a, . . . , and 324n. The transmitter 206 may be substantially similar to the transmitter 206 described in FIG. 2.

The scrambler 302 may comprise suitable logic, circuitry, and/or code that may enable scrambling of a pattern of binary 0's and 1's contained within transmitted data to prevent long sequences of consecutive 0's or 1's. The encoder parser 304 may comprise suitable logic, circuitry, and/or code that may enable receiving bits from a single input stream, and distributing each of the bits to one of a plurality of output streams.

The encoder/puncture block 306a may comprise suitable logic, circuitry, and/or code that may enable received data to be encoded to enable error correction. An encoder/puncture block 306a may encode data based on a forward error correction (FEC) coding method, such as binary convolutional coding (BCC), or low density parity check (LDPC) coding. The FEC coding method may generate encoded data, which may be characterized by a coding rate. The coding rate may represent a measure based on the number of received data bits and the number of encoded data bits. The encoder/puncture block 306a may also perform puncturing of encoded data to modify the coding rate, for example, to change a ½ coding rate to a ¾ coding rate. The encoder/puncture block 306n may be substantially similar to the encoder/puncture block 506a.

The stream parser 308 may comprise suitable logic, circuitry, and/or code that may receive one or more input data streams, and distribute each bit from each input data stream to one of a plurality of spatial streams. The interleaver 310a may comprise suitable logic, circuitry, and/or code that may enable reordering of bits in a received spatial stream. The interleaver 310a may reorder bits such that if binary values for a block of contiguous transmitted bits are corrupted during transmission, the individual bits may be corrected by an FEC coding method at a receiving station, which receives the block of corrupted bits. At the receiving station, the received block of corrupted contiguous bits may be separated by a deinterleaver. After separation, a single corrupted bit may be contiguous with a block of non-corrupted bits. The separation of corrupted bits may enable a FEC coding method to correct the binary values of the bits, which may have been corrupted during transmission. The interleaver 310n may be substantially similar to the interleaver 310a.

The constellation mapper block 312a may comprise suitable logic, circuitry, and/or code that may enable a sequence of bits in a received data stream to be mapped to a selected constellation point. The selected constellation point may be determined based on a modulation type utilized for transmitting data associated with the spatial stream, for example 64-level quadrature amplitude modulation (64-QAM). The selected constellation point may be referred to as an individual data symbol. For example, for 64-QAM, the constellation mapper block 312a may receiver a sequence of six bits, determine a binary value for the sequence of six bits, and select a constellation point, which may correspond to the binary value. When the transmitter utilizes orthogonal frequency division multiplexing (OFDM), the constellation mapper 312a may enable the generation of OFDM symbols. An OFDM symbol may comprise a plurality of individual data symbols. The OFDM symbol may be generated by selecting a plurality of frequency carriers associated with an RF channel, such as a downlink channel, and generating an individual data symbol corresponding to each selected frequency carrier associated with the downlink channel. The constellation mapper block 312a may output a spatial stream comprising a sequence of OFDM symbols, which may be generated at sequential time instants. The constellation mapper block 312n may be substantially similar to the constellation mapper block 312a.

The STBC/SFBC block 314 may comprise suitable logic, circuitry, and/or code that may enable reception of symbols from a plurality of input spatial streams and generation of a plurality of space time streams or a plurality of space frequency streams. In instances when STBC may be utilized by the transmitter 204 in an exemplary 4×1 diversity transmission system, the STBC/SFBC block 314 may receive a sequence of symbols, $x(t_0)$, $x(t_1)$, $x(t_2)$ and $x(t_3)$, from a single spatial stream at distinct time instants $t_0$, $t_1$, $t_2$ and $t_3$ respectively, for example. During a first exemplary output cycle, the STBC/SFBC block 314 may output a codeword $s(\mathbf{0,0})=x(t_0)$, via a first space time stream, a codeword $s(\mathbf{1,0})=-x^*(t_1)$, via a second space time stream, a codeword $s(\mathbf{2,0})=x(t_2)$, via a third space time stream and a codeword $s(\mathbf{3,0})=-x^*(t_3)$, via a fourth space time stream. During a second exemplary output cycle, the STBC/SFBC block 314 may output a codeword $s(\mathbf{0,1})=x(t_1)$, via the first space time stream, a codeword $s(\mathbf{1,1})=x^*(t_0)$, via the second space time stream, a codeword $s(\mathbf{2,1})=x(t_3)$, or via the third space time stream, a codeword $s(\mathbf{3,1})=x^*(t_2)$, via the fourth space time stream.

During a third exemplary output cycle, the STBC/SFBC block 314 may output a codeword $s(\mathbf{0,2})=x(t_2)$, via the first space time stream, a codeword $s(\mathbf{1,2})=-x^*(t_3)$, via the second space time stream, a codeword $s(\mathbf{2,2})=x(t_0)$, or via the third space time stream and a codeword $s(\mathbf{3,2})=-x^*(t_1)$, via the fourth space time stream. During a fourth exemplary output cycle, the STBC/SFBC block 314 may output a codeword $s(\mathbf{0,3})=x(t_3)$, via the first space time stream, a codeword $s(\mathbf{1,3})=x^*(t_2)$, via the second space time stream, a codeword $s(\mathbf{2,3})=x(t_1)$, or via the third space time stream and a codeword $s(\mathbf{3,3})=x^*(t_0)$, via the fourth space time stream.

In instances when STBC may be utilized by the transmitter 204 in an exemplary 2×1 diversity transmission system, the STBC/SFBC block 314 may receive a sequence of symbols, $x(t_0)$ and $x(t_1)$ from a single spatial stream at distinct time instants $t_0$ and $t_1$ respectively, for example. During a first exemplary output cycle, the STBC/SFBC block 314 may output a codeword $s(\mathbf{0,0})=x(t_0)$, via a first space time stream and a codeword $s(\mathbf{1,0})=-x^*(t_1)$, via a second space time stream. During a second exemplary output cycle, the STBC/SFBC block 314 may output a codeword $s(\mathbf{0,1})=x(t_1)$, via the first space time stream and a codeword $s(\mathbf{1,1})=x^*(t_0)$, via the second space time stream. During a third exemplary output cycle, the STBC/SFBC block 314 may output a codeword $s(\mathbf{0,2})=x(t_2)$, via a first space time stream and a codeword $s(\mathbf{1,2})=-x^*(t_3)$, via a second space time stream. During a fourth exemplary output cycle, the STBC/SFBC block 314 may output a codeword $s(\mathbf{0,3})=x(t_3)$, via the first space time stream and a codeword $s(\mathbf{1,3})=x^*(t_2)$, via the second space time stream.

In a second exemplary 2×1 diversity transmission system, during the first exemplary output cycle, the STBC/SFBC block 314 may output a codeword $s(\mathbf{0,0})=x(t_0)$, via the first space time stream and a codeword $s(\mathbf{2,0})=x(t_2)$, via a third space time stream. During a second exemplary output cycle, the STBC/SFBC block 314 may output a codeword $s(\mathbf{0,1})=x(t_1)$, via the first space time stream and a codeword $s(\mathbf{2,1})=x(t_3)$, via the third space time stream. During a third exemplary output cycle, the STBC/SFBC block 314 may output a codeword $s(\mathbf{0,2})=x(t_2)$, via a first space time stream and a codeword $s(\mathbf{2,2})=x(t_0)$, via a third space time stream. During a fourth exemplary output cycle, the STBC/SFBC block 314 may output a codeword $s(\mathbf{0,3})=x(t_3)$, via the first space time stream and a codeword $s(\mathbf{2,3})=x(t_1)$, via the third space time stream.

In a third exemplary 2×1 diversity transmission system, during the first exemplary output cycle, the STBC/SFBC block 314 may output a codeword $s(\mathbf{0,0})=x(t_0)$, via the first space time stream and a codeword $s(\mathbf{3,0})=-x^*(t_3)$, via a fourth space time stream. During a second exemplary output cycle, the STBC/SFBC block 314 may output a codeword $s(\mathbf{0,1})=x(t_1)$, via the first space time stream and a codeword $s(\mathbf{3,1})=x^*(t_2)$, via the fourth space time stream. During a third exemplary output cycle, the STBC/SFBC block 314 may output a codeword $s(\mathbf{0,2})=x(t_2)$, via a first space time stream and a codeword $s(\mathbf{3,2})=-x^*(t_1)$, via a fourth space time stream. During a fourth exemplary output cycle, the STBC/SFBC block 314 may output a codeword $s(\mathbf{0,3})=x(t_3)$, via the first space time stream and a codeword $s(\mathbf{3,3})=x^*(t_0)$, via the fourth space time stream.

In instances when STBC may be utilized by the transmitter 204 in an exemplary 2×4 diversity transmission system, the STBC/SFBC block 314 may receive a sequence of symbols, $x_0(t_0)$ and $x_0(t_1)$ from a first spatial stream at distinct time instants $t_0$ and $t_1$ respectively, and a sequence of symbols, $x_1(t_2)$ and $x_1(t_3)$ from a second spatial stream also at distinct time instants $t_0$ and $t_1$ respectively, for example. During a first exemplary output cycle, the STBC/SFBC block 314 may output a codeword $s(\mathbf{0,0})=x_0(t_0)$, via a first space time stream and a codeword $s(\mathbf{1,0})=-x_0^*(t_1)$, via a second space time stream. The STBC/SFBC block 314 may also output a codeword $s(\mathbf{2,0})=x_1(t_0)$, via a third space time stream and a codeword $s(\mathbf{3,0})=-x_1^*(t_1)$, via a fourth space time stream. During a second exemplary output cycle, the STBC/SFBC block 314 may output a codeword $s(\mathbf{0,1})=x_0(t_1)$, via a first space time stream and a codeword $s(\mathbf{1,1})=x_0^*(t_0)$, via a second space time stream. The STBC/SFBC block 314 may also output a codeword $s(\mathbf{2,1})=x_1(t_1)$, via a third space time stream and a codeword $s(\mathbf{3,1})=x_1^*(t_0)$, via a fourth space time stream.

The CSD block 316 may comprise suitable logic, circuitry and/or code that may enable input of a stream, and output of a time-shifted version of the stream. For example, the CSD block 316 may receive an input stream and output a time-delayed version of the received input stream.

The IFFT block 320a may comprise suitable logic, circuitry and/or code that may enable calculations, based on an IFFT algorithm, to transform a frequency-domain representation of an input signal to generate output signals, which may comprise a time-domain representation of the input signal. The IFFT block 320n may be substantially similar to the IFFT block 320a.

The insert GI window block 322a may comprise suitable logic, circuitry and/or code that may enable receipt of an input signal and generation of an output signal by insertion of guard intervals in the received input signal. The input signal may comprise a sequence of symbols. The guard interval may represent a time interval between individual symbols, which may establish a minimum time duration between the end of one symbol and the beginning of a succeeding symbol. The insert GI window block 322n may be substantially similar to the insert GI window block 322a.

The RFE block 324a may comprise suitable logic, circuitry, and/or code that may enable reception of an input signal, and generation of an RF output signal. The RFE block 324a may generate the RF output signal by utilizing a channel frequency carrier signal to upconvert the input signal. The channel frequency carrier signal may have a frequency, $f_{Ch}$. In an exemplary OFDM transmission system, the channel frequency carrier signal may be applied to upconvert the input signal such that half of the $N_{fc}$ number of OFDM frequency carriers may be upconverted to frequencies lower than $f_{Ch}$, and half of the $N_{fc}$ number of OFDM frequency carriers may be upconverted to frequencies higher than $f_{Ch}$. Within a transmitter 204, which may be compliant with IEEE 802.11 standards, the RFE block 324a may enable generation of 20 MHz bandwidth RF signal, or of 40 MHz bandwidth RF signal, for example. The RFE block 324a may enable amplification of the RF output signal and subsequent transmission of the amplified signal via the transmitting antenna 232a.

In various embodiments of the invention, the RFE block 324a may receive a control signal, which configures the RFE block 324a to generate the amplified RF output signal. Alternatively, the control signal may configure the RFE block 324a to inhibit generation of the amplified RF output signal. Configuring the RFE block 324a to generate the amplified RF output signal may enable transmission of the amplified signal via the transmitting antenna 232a. Configuring the RFE block 324a to inhibit generation of the amplified RF output signal may disable transmission of a signal via the transmitting antenna 232a. The RFE block 324n may be substantially similar to the RFE block 324a. The transmitting antenna 232n may be substantially similar to the transmitting antenna 232a.

In operation, the processor 206 may send data to the scrambler block 302. The scrambled data from the scrambler block 202 may be sent to the encoder parser block 304. The encoder parser 304 may distribute the scrambled data among the encoder/parser blocks 306a . . . 306n. The processor 206 may send control signals to configure the encoder/puncture blocks 306a . . . 306n by selecting a coding rate and/or puncture rate. The processor 206 may select a different coding rate and/or puncture rate for each spatial stream. Each of the plurality of encoder/puncture blocks 306a . . . 306n may generate a corresponding encoded stream. The spatial parser 308 may receive the plurality of encoded streams and distribute bits contained in the received encoded streams among a plurality of $N_{SS}$ spatial streams. In an exemplary embodiment of the invention, $N_{SS}=1$, however, various embodiments of the invention may not be so limited and may be practiced for systems in which $N_{SS}>1$.

For each of the generated spatial streams the interleaver 310a may reorder the sequence of bits in the received spatial stream to generate a bit-interleaved spatial stream. The constellation mapper 312a may receive the bit-interleaved spatial stream from the interleaver 310a and generate a modulated spatial stream, which may comprise a sequence of symbols. The processor 206 may send control signals to configure the constellation mapper 312a by selecting a modulation type and/or a number of frequency carriers $N_{fc}$. The number of frequency carriers may determine the bandwidth of the RF signal, which may ultimately be transmitted by the transmitter 204. For an exemplary 20 MHz bandwidth RF signal, $N_{fc}=56$, while for an exemplary 40 MHz RF signal $N_{fc}=112$.

The processor 206 may send control signals to configure the STBC/SFBC block 314. The STBC/SFBC block 314 may be configured for STBC operation, for example. The STBC/SFBC block 314 may be configured for an $N_{SS} \times N_{TX}$ diversity transmission system based on $N_{SS}$ spatial streams and $N_{TX}$ transmitting antennas at the transmitting station AP 102. In various embodiments of the invention, the STBC/SFBC block 314 may be configured to generate a number of space time streams, $N_{sts}$, equal to the number of transmitting antennas, $N_{TX}$, at the transmitting station AP 102. The plurality of space time streams may be sent to the CSD block 316.

The processor 206 may send control signals to configure the CSD block 316. The CSD block 316 may be configured to insert time delays to change the relative time relation between the individual space time steams. In a diversity transmission system, the CSD block 316 may be configured to prevent beamforming among RF output signals concurrently transmitted by an AP 102.

The IFFT blocks 320a . . . 320n may perform IFFT conversion on a corresponding one of the time shifted space time streams generated by the CSD block 316. Each of the IFFT blocks 320a . . . 320n may generate a time domain signal. The insert GI window block 322a . . . 322n may insert a minimum time spacing between consecutive symbols contained in a corresponding received time domain signal. The processor 206 may send control signals to each of the RFE blocks 324a . . . 324n, which enable or disable the generation of RF output signals based on a selected diversity transmission configuration at the transmitting station AP 102. Each of the enabled RFE blocks 324a . . . 324n may generate an RF output signals from an input signal received from a corresponding one of the insert GI window blocks 322a . . . 322n. The processor 206 may also send control signals to each of the enabled RFE blocks 324a . . . 324n to configure a channel frequency, $f_{Ch}$, which may be utilized to upconvert the received input signal. Each of the enabled RFE blocks 324a . . . 324n may transmit an amplified RF signal via a corresponding transmitting antenna 232a . . . 232n.

In an exemplary embodiment of the invention, the processor 206 may select a diversity transmission configuration at the AP 102 based on uplink signals received from the STA 104. In an exemplary embodiment of the invention, the AP 102 may compute a transfer function matrix H based on the received uplink signals. In an exemplary 2×1 diversity transmission system, the processor 206 may select to transmit signals from the first space time stream and select to transmit signals from one of the remaining space time streams based on the computed transfer function matrix. For example, the processor 206 may evaluate each of the transfer function coefficients, $h_k$, associated with each of the transmitting antennas 232a . . . 232n, which correspond to the remaining space time streams. The processor 206 may select the transmitting antenna for which the associated transfer coefficient has the largest value. The processor 206 may configure the STBF/SFBC block 314 and RFE blocks 324a . . . 324n based on the selected transmitting antenna. In an alternative exemplary embodiment of the invention, the processor 206 at the AP 102 may configure the STBC/SFBC block 314 and the corresponding RFE blocks 324a . . . 324n based on channel feedback information received from the STA 104.

Various embodiments of the invention may be practiced in a range of wired or wireless communication systems. As an example, various aspects of the invention may be practiced in a cellular communication network.

Figure 4:
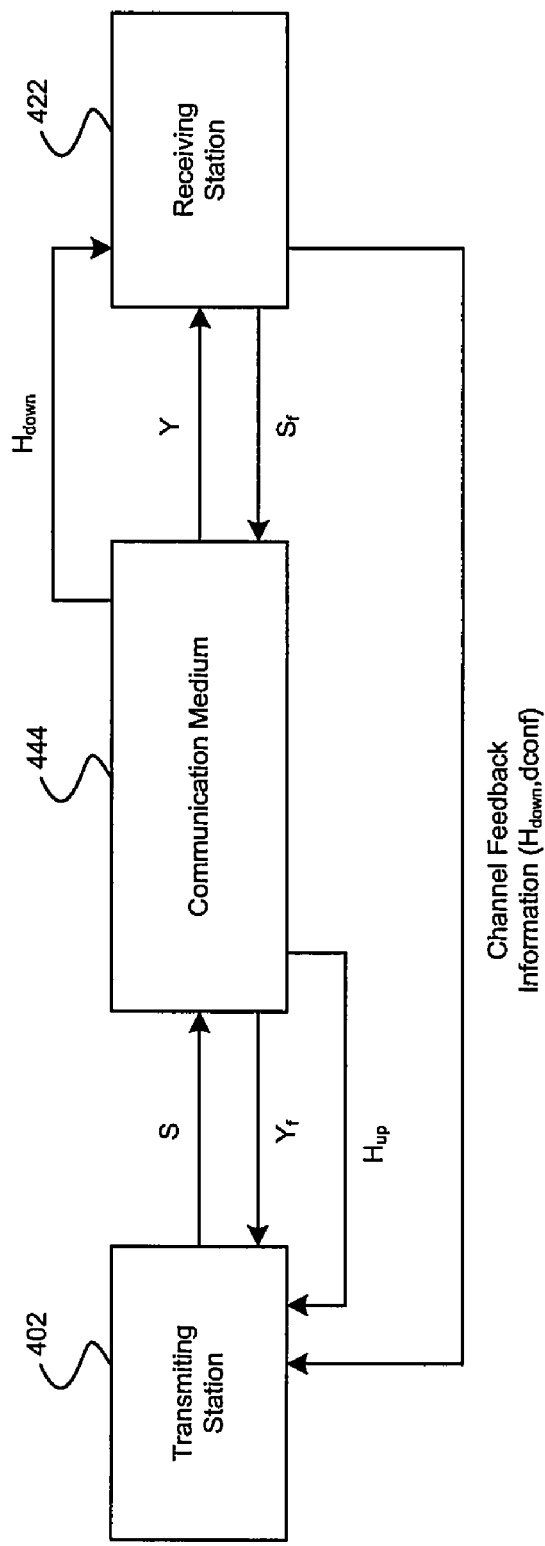
FIG. 4 is an exemplary diagram illustrating channel feedback, which may be utilized in connection with an embodiment of the invention.

FIG. 4 is an exemplary diagram illustrating channel feedback, which may be utilized in connection with an embodiment of the invention. Referring to FIG. 4, there is shown a transmitting station 402, a receiving station 422, and a communications medium 444. The communications medium 444 may represent a wireless communications medium. The transmitting station 402 may represent an AP 102 and the receiving station may represent an STA 104, for example. The transmitting station 402 may transmit a signal vector S to the receiving station 422 via the communications medium 444. The communications direction from the transmitting station 402 to the receiving station 422 may be referred to as a downlink direction. The signal vector S may comprise a plurality of TX chain signals simultaneously transmitted via one or more transmitting antennas. The signal vector S may travel through the communications medium 444. The signal vector S may be altered while traveling through the communications medium 444. The transmission characteristics associated with the communications medium 444 may be characterized by a transfer function, H. The signal vector S may be altered based on the transfer function H. In the downlink direction, the transfer function H may be referred to as $H_{down}$. The altered signal vector S may be represented as the signal Y. The receiving station 422 may receive the signal Y. The receiving station 422 may compute one or more transfer coefficient values, $h_i$, associated with the transfer function $H_{down}$ based on the signal Y received via the communications medium 444.

The receiving station 422 may generate diversity configuration feedback information based on the computed transfer function $H_{down}$. The receiving station 422 may communicate the computed transfer function $H_{down}$ and/or diversity configuration feedback information, dconf, to the transmitting station 402 as channel feedback information ($H_{down}$, dconf). The receiving station 422 may communicate the channel feedback information ($H_{down}$, dconf) via a transmitted signal vector $S_f$. The transmitted signal vector $S_f$ may be transmitted to the transmitting station 402 via the communications medium 444. The signal vector $S_f$ may be altered while traveling through the communications medium 444. The communications direction from the receiving station 422 to the transmitting station 402 may be referred to as an uplink direction. The signal vector $S_f$ may be altered based on the transfer function H. In the uplink direction, the transfer function H may be referred to as $H_{up}$. The altered signal vector $S_f$ may be represented as the signal $Y_f$. The transmitting station 402 may receive the signal $Y_f$. The transmitting station 402 may utilize the channel feedback information ($H_{down}$, dconf) to determine a diversity transmission configuration, which may be utilized to generate subsequent transmitted RF signals S.

The transmitting station 402 may compute one or more values associated with the transfer function $H_{up}$ based on the signal $Y_f$ received via the communications medium 444. The transmitting station 402 may utilize the computed transfer function $H_{up}$ to determine a diversity transmission configuration. In this regard, the transmitting station 402 may determine the diversity transmission configuration without utilizing channel feedback information. The diversity transmission configuration, determined without utilizing channel feedback information, may be utilized to generate subsequent transmitted RF signals S.

Figure 5A:
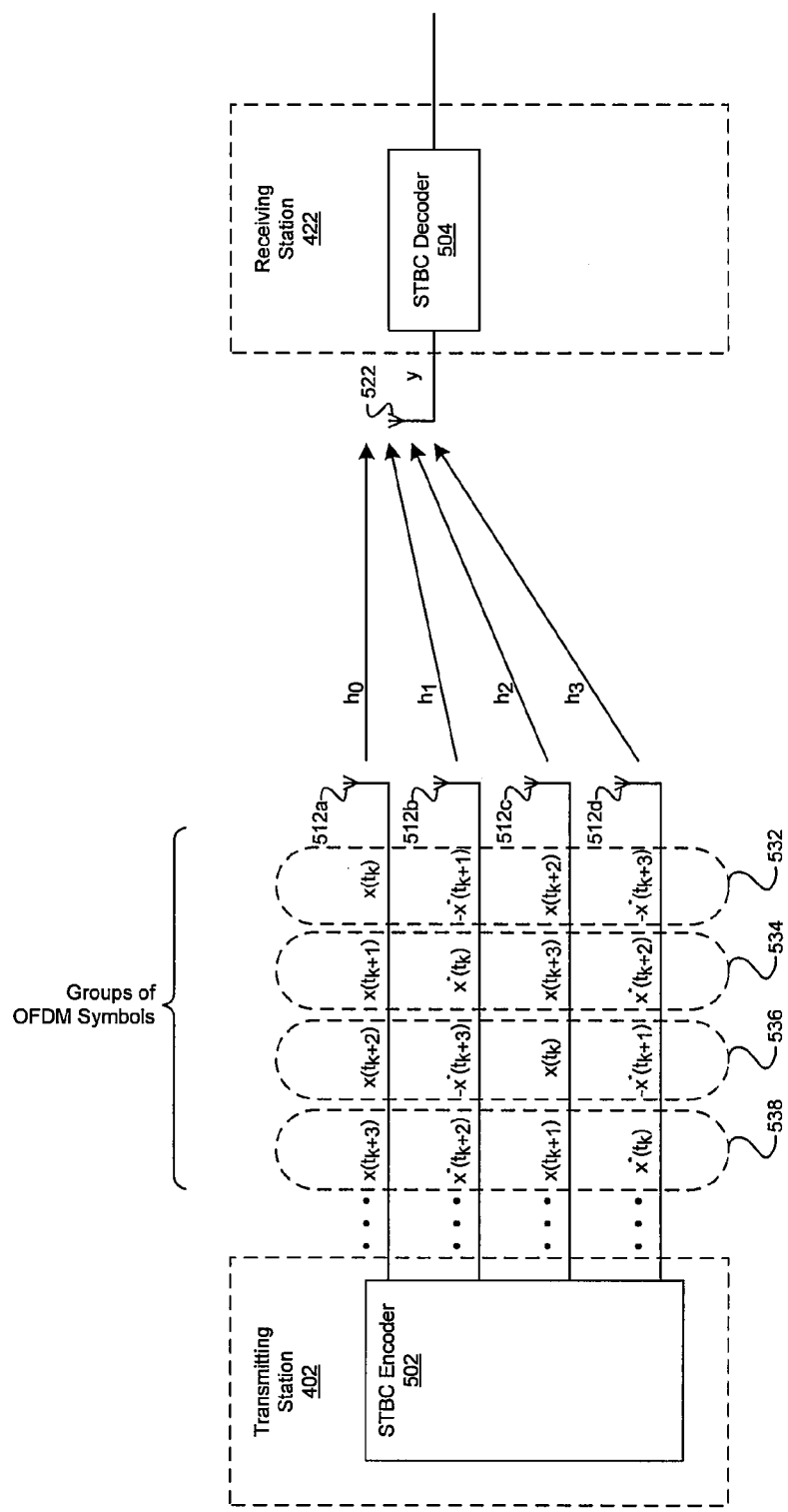
FIG. 5A is an exemplary block diagram of STBC in a 4×1 diversity transmission system, in accordance with an embodiment of the invention.

FIG. 5A is an exemplary block diagram of STBC in a 4×1 diversity transmission system, in accordance with an embodiment of the invention. Referring to FIG. 5A, there is shown a transmitting station 402 and a receiving station 422. The transmitting station 402 may comprise an STBC encoder 502. The transmitting station 402 may utilize diversity transmission by simultaneously transmitting a plurality of RF output signals via at least a portion of the transmitting antennas 512a, 512b, 512c and 512d. The receiving station 422 may comprise an STBC decoder 504. The receiving station 422 may receive signals via a receiving antenna 522.

At successive time instants, the transmitting station 402 may utilize STBC to concurrently transmit groups of codewords 532, 534, 536 and 538. In an exemplary embodiment of the invention, each of the individual codewords $x(t_k)$ may comprise an OFDM symbol, which occurs within a data stream at a time instant $t_k$. Thus, in a 4×1 STBC diversity transmission system, a plurality of codewords $x(t_k)$, $x(t_{k+1})$, $x(t_{k+2})$ and $x(t_{k+3})$, which occur within a single data stream at time instants $t_k$, $t_{k+1}$, $t_{k+2}$ and $t_{k+3}$, may be concurrently transmitted via the plurality of transmitting antennas 512a, 512b, 512c and 512d. When transmitting the group of codewords 532, the transmitting station 402 may transmit a codeword $s(0,k)=x(t_k)$ via transmitting antenna 512a, and a codeword $s(1,k+1)=-x^*(t_{k+1})$ via transmitting antenna 512b, where $x^*$ may refer to a complex conjugate of x. The transmitting station 402 may also transmit a codeword $s(2,k+2)=x(t_{k+2})$ via transmitting antenna 512c, and a codeword $s(3,k+3)=-x^*(t_{k+3})$ via transmitting antenna 512d.

When transmitting the group of codewords 534, the transmitting station 402 may transmit a codeword $s(0,k+1)=x(t_{k+1})$ via transmitting antenna 512a, and a codeword $s(1,k)=x^*(t_k)$ via transmitting antenna 512b. The transmitting station 402 may also transmit a codeword $s(2,k+3)=x(t_{k+3})$ via transmitting antenna 512c, and a codeword $s(3,k+2)=x^*(t_{k+2})$ via transmitting antenna 512d.

When transmitting the group of codewords 536, the transmitting station 402 may transmit a codeword $s(0,k+2)=x(t_{k+2})$ via transmitting antenna 512a, and a codeword $s(1,k+3)=-x^*(t_{k+3})$ via transmitting antenna 512b. The transmitting station 402 may also transmit a codeword $s(2,k)=x(t_k)$ via transmitting antenna 512c, and a codeword $s(3,k+1)=-x^*(t_{k+1})$ via transmitting antenna 512d.

When transmitting the group of codewords 538, the transmitting station 402 may transmit a codeword $s(0,k+3)=x(t_{k+3})$ via transmitting antenna 512a, and a codeword $s(1,k+2)=x^*(t_{k+2})$ via transmitting antenna 512b. The transmitting station 402 may also transmit a codeword $s(2,k+1)=x(t_{k+1})$ via transmitting antenna 512c, and a codeword $s(3,k)=x^*(t_k)$ via transmitting antenna 512d.

After the receiving station 422 receives, via the receiving antenna 522, the sequence of concurrently transmitted groups of codewords 532, 534, 536 and 538, carried via the propagation paths characterized by the transfer function coefficients $h_0$, $h_1$, $h_2$ and $h_3$, the STBC decoder 504 may generate estimated values for individual codewords $x'(t_k)$, $x'(t_{k+1})$, . . .

In various embodiments of the invention, a selected one of the transmit chains may enable transmission, over a time duration, of a sequence of individual codewords $x(t_k)$, $x(t_{k+1})$, . . . in a diversity transmission system, which correspond to a sequence of individual codewords, which may be transmitted by a SISO transmission system. In the exemplary embodiment of the invention shown in FIG. 5A, the transmit chain associated with the transmitting antenna 512a is utilized by the transmitting station 402 to transmit a sequence of individual codewords, which correspond to a sequence of individual codewords, which may be transmitted by a SISO transmission system. This aspect of the invention enables the transmitting station 402, which is configured as a 4×1 diversity transmission system in FIG. 5A, to be reconfigured to transmit signals, which may be received by a receiving station 402 that utilizes SISO technology, by disabling the transmission of individual data symbols from the transmitting antennas 512b, 512c and 512d, for example.

Figure 5B:
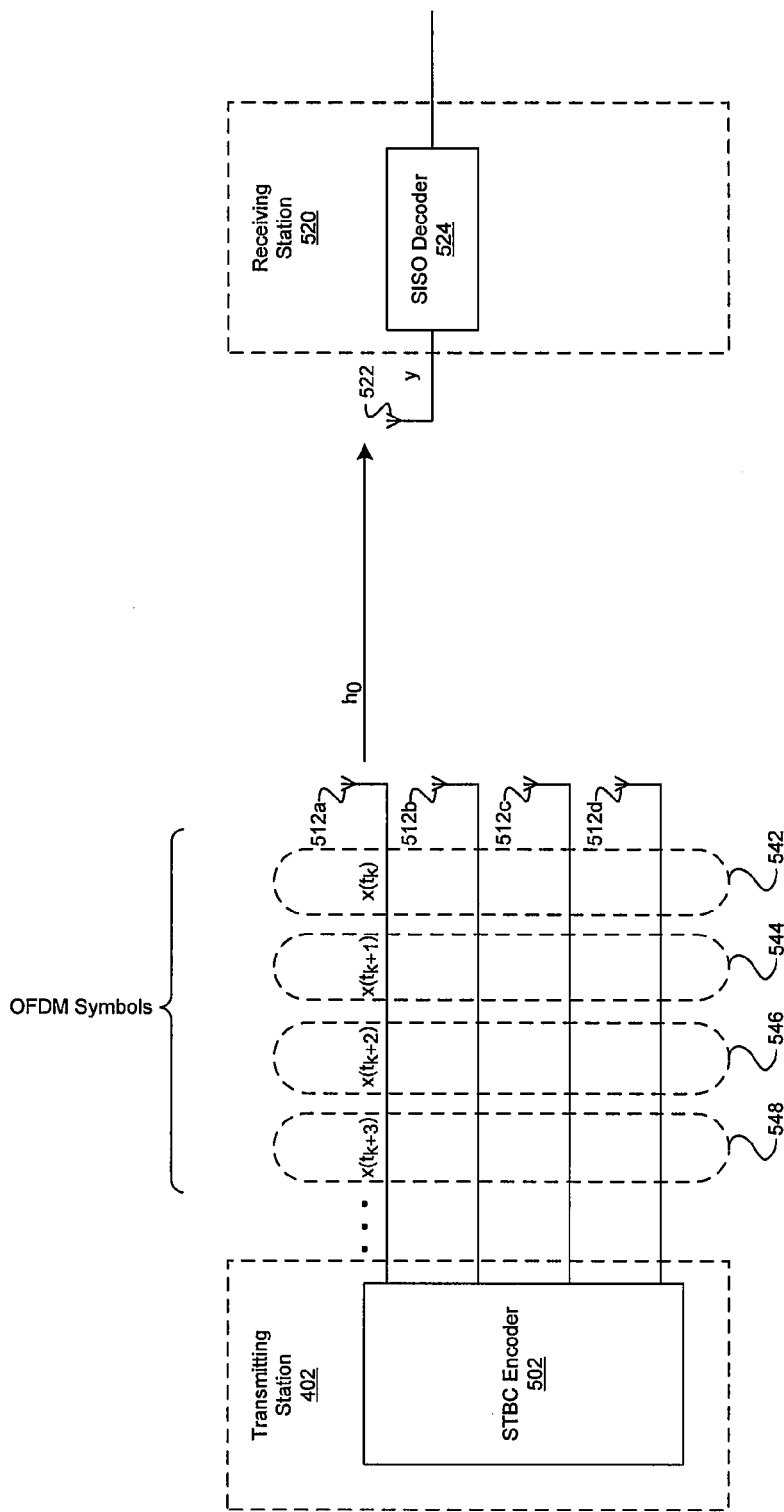
FIG. 5B is an exemplary block diagram of STBC in a 4×1 diversity transmission system reconfigured for SISO transmission, in accordance with an embodiment of the invention.

FIG. 5B is an exemplary block diagram of STBC in a 4×1 diversity transmission system reconfigured for SISO transmission, in accordance with an embodiment of the invention. Referring to FIG. 5B, there is shown a transmitting station 402 and a receiving station 520. The transmitting station 402 may comprise an STBC encoder 502. The transmitting station 402 may utilize SISO transmission by transmitting RF output signals via at least a single transmitting antenna 512a, for example. The receiving station 520 may comprise an SISO decoder 524. The receiving station 520 may receive signals via a receiving antenna 522.

FIG. 5B shows the transmitting station 402 in FIG. 5A after being reconfigured for SISO transmission. In this regard, the transmitting station 402 may be reconfigured to inhibit transmission of signals from the transmitting antennas 512b, 512c and 512d. The signals transmitted from the remaining enabled transmitting antenna 512a may comprise a sequence of signal, which may be transmitted by a SISO transmission system. At successive time instants, the transmitting station 402 may utilize transmit codewords 542, 544, 546 and 548. When transmitting the codeword 542, the transmitting station 402 may transmit a codeword $s(0,k)=x(t_k)$ via transmitting antenna 512a. When transmitting the codeword 544, the transmitting station 402 may transmit a codeword $s(0,k+1)=x(t_{k+1})$ via transmitting antenna 512a. When transmitting the codeword 546, the transmitting station 402 may transmit a codeword $s(0,k+2)=x(t_{k+2})$ via transmitting antenna 512a. When transmitting the codeword 548, the transmitting station 402 may transmit a codeword $s(0,k+3)=x(t_{k+3})$ via transmitting antenna 512a.

The receiving station 520 may receive the sequence of transmitted codewords, carried via the propagation path characterized by the transfer function coefficient $h_0$. The SISO decoder 524 may generate estimated values for individual codewords $X'(t_k)$, $x'(t_{k+1})$, ...

Figure 5C:
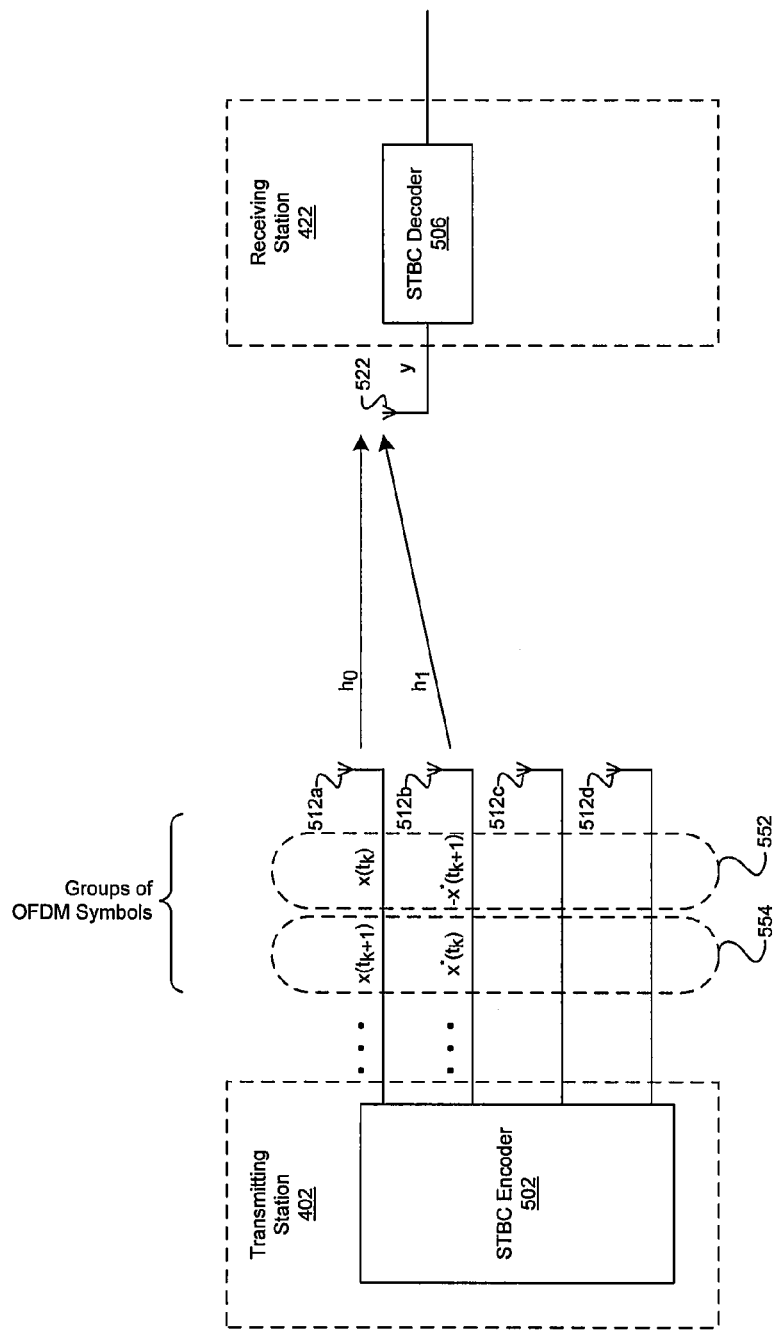
FIG. 5C is an exemplary block diagram of STBC in a 2×1 diversity transmission system, in accordance with an embodiment of the invention.

FIG. 5C is an exemplary block diagram of STBC in a 2×1 diversity transmission system, in accordance with an embodiment of the invention. Referring to FIG. 5C, there is shown a transmitting station 402 and a receiving station 422. The transmitting station 402 may comprise an STBC encoder 502. The transmitting station 402 may utilize diversity transmission by simultaneously transmitting a plurality of RF output signals via the transmitting antennas 512a and 512b. The receiving station 422 may comprise an STBC decoder 506. The receiving station 422 may receive signals via a receiving antenna 522.

At successive time instants, the transmitting station 402 may utilize STBC to concurrently transmit groups of codewords 552 and 554. In an exemplary embodiment of the invention, each of the individual codewords $x(t_k)$ may comprise an OFDM symbol, which occurs within a data stream at a time instant $t_k$. Thus, in a 2×1 STBC diversity transmission system, a plurality of codewords $x(t_k)$ and $x(t_{k+1})$, which occur within a single data stream at time instants $t_k$ and $t_{k+1}$, may be concurrently transmitted via the plurality of transmitting antennas 512a and 512b. When transmitting the group of codewords 552, the transmitting station 402 may transmit a codeword $s(0,k)=x(t_k)$ via transmitting antenna 512a, and a codeword $s(1,k+1)=-x^*(t_{k+1})$ via transmitting antenna 512b. When transmitting the group of codewords 554, the transmitting station 402 may transmit a codeword $s(0,k+1)=x(t_{k+1})$ via transmitting antenna 512a, and a codeword $s(1,k)=x^*(t_k)$ via transmitting antenna 512b.

After the receiving station 422 receives, via the receiving antenna 522, the sequence of concurrently transmitted groups of codewords 552 and 554, carried via the propagation paths characterized by the transfer function coefficients $h_0$ and $h_1$, the STBC decoder 506 may generate estimated values for individual codewords $x'(t_k)$ and $x'(t_{k+1})$, ...

Figure 6:
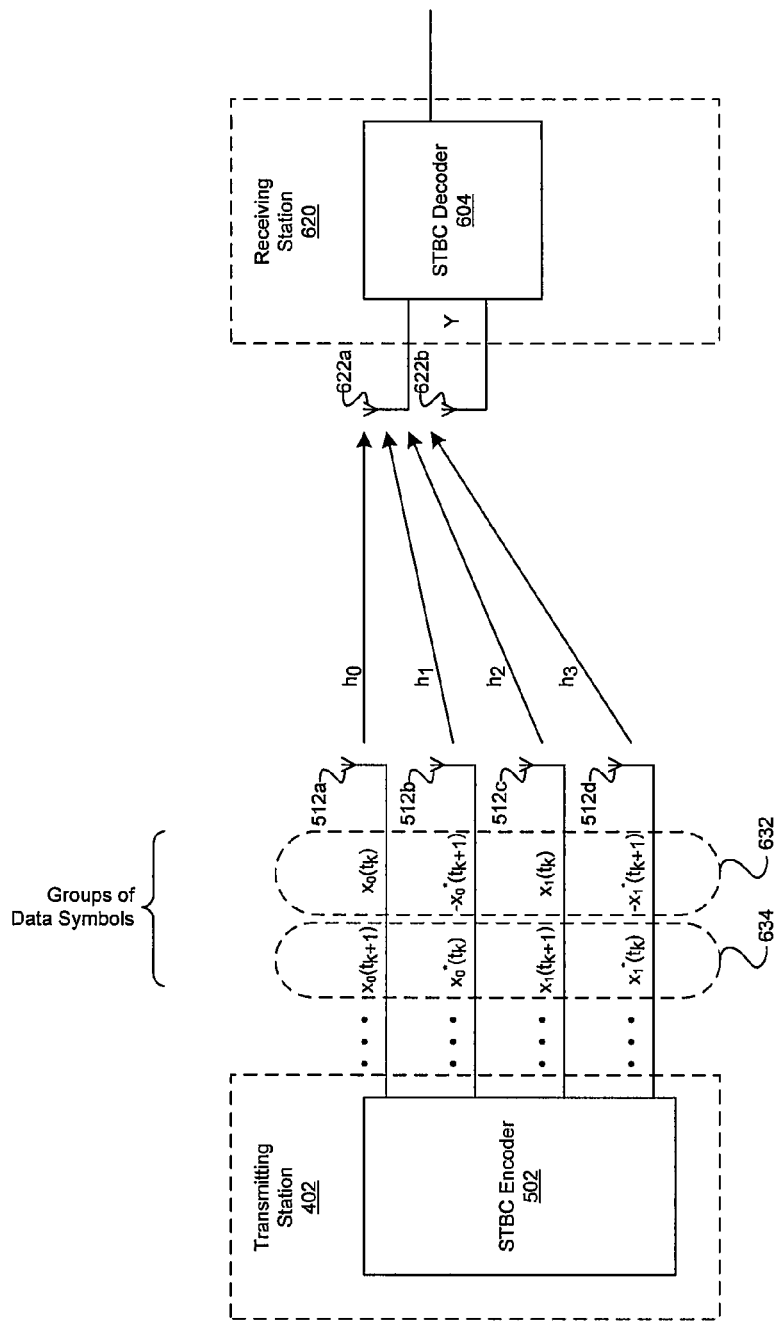
FIG. 6 is an exemplary block diagram of STBC in a 4×2 diversity transmission system, in accordance with an embodiment of the invention.

FIG. 6 is an exemplary block diagram of STBC in a 4×2 diversity transmission system, in accordance with an embodiment of the invention. Referring to FIG. 6, there is shown a transmitting station 402 and a receiving station 422. The transmitting station 402 may comprise an STBC encoder 502. The transmitting station 402 may utilize diversity transmission by simultaneously transmitting a plurality of RF output signals via the transmitting antennas 512a, 512b, 512c and 512d. The receiving station 422 may comprise an STBC decoder 604. The receiving station 422 may receive signals via receiving antennas 622a and 622b.

At successive time instants, the transmitting station 402 may utilize STBC to concurrently transmit groups of codewords 632 and 634. In an exemplary embodiment of the invention, each of the individual codewords $x(t_k)$ may comprise an OFDM symbol, which occurs within a data stream at a time instant $t_k$. Thus, in a 4×2 STBC diversity transmission system, a plurality of codewords $x_0(t_k)$ and $x_0(t_{k+1})$, which occur within a first data stream at time instants $t_k$ and $t_{k+1}$, and a plurality of codewords $x_1(t_k)$ and $x_1(t_{k+1})$, which occur within a second data stream at time instants $t_k$ and $t_{k+1}$, may be concurrently transmitted via the plurality of transmitting antennas 512a, 512b, 512c and 512d. When transmitting the group of codewords 632, the transmitting station 402 may transmit a codeword $s(0,k)=x_0(t_k)$ via transmitting antenna 512a, and a codeword $s(1,k+1)=-x_0^*(t_{k+1})$ via transmitting antenna 512b. The transmitting station 402 may also transmit a codeword $s(2,k)=x_1(t_k)$ via transmitting antenna 512c, and a codeword $s(3,k+1)=-x_1^*(t_{k+1})$ via transmitting antenna 512d.

When transmitting the group of codewords 634, the transmitting station 402 may transmit a codeword $s(0,k+1)=x_0(t_{k+1})$ via transmitting antenna 512a, and a codeword $s(1,k)=x_0^*(t_k)$ via transmitting antenna 512b. The transmitting station 402 may also transmit a codeword $s(2,k+1)=x_1(t_{k+1})$ via transmitting antenna 512c, and a codeword $s(3,k)=x_1^*(t_k)$ via transmitting antenna 512d.

After the receiving station 422 receives, via the receiving antennas 622a and 622b, the sequence of concurrently transmitted groups of codewords 632 and 634, carried via the propagation paths characterized by the transfer function coefficients $h_0$, $h_1$, $h_2$ and $h_3$, the STBC decoder 604 may generate estimated values for individual codewords $x_0'(t_k)$ and $x_0'(t_{k+1})$, and codewords $x_1'(t_k)$ and $x_1'(t_{k+1})$.

Figure 7:
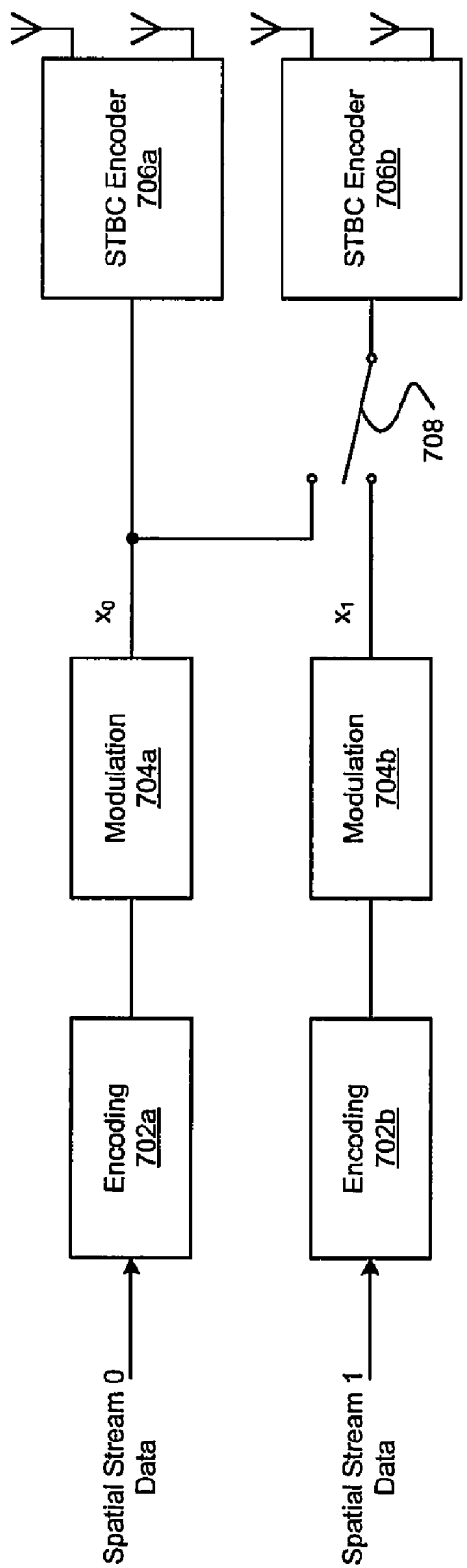
FIG. 7 is an exemplary block diagram of STBC in a reconfigurable diversity transmission system, in accordance with an embodiment of the invention.

FIG. 7 is an exemplary block diagram of STBC in a reconfigurable diversity transmission system, in accordance with an embodiment of the invention. Referring to FIG. 7, there is shown encoding blocks 702a and 702b, modulation blocks 704a and 704b, STBC encoder blocks 706a and 706b, and a switch 708. The STBC encoder block 706a may receive input from a single spatial stream and generate two space time streams, for example. The STBC encoder block 706a may be utilized to implement a 2×1 diversity transmission module. The STBC encoder block 706b may be substantially similar to the STBC encoder block 706a.

The encoding block 702a may receive input data from a spatial stream 0 and generate encoded output data. The modulation block 704a may receive the encoded data from the encoding block 702a and generate codewords $x_0$. The output from the modulation block 704a may be coupled to the input of the STBC encoder block 706a. The encoding block 702b may receive input data from a spatial stream 1 and generate encoded output data. The modulation block 704b may receive the encoded data from the encoding block 702b and generate codewords $x_1$. The STBC encoder blocks 706a and 706b may be configured to implement a 4×$N_{SS}$ diversity transmission module, where $N_{SS}$ represents the number of spatial streams.

The value for $N_{SS}$ may be configured based on the setting of the switch 708. When the switch 708 is configured to couple the output of the modulation block 704a to the input to the STBC encoder block 706b, the STBC encoder block 706b may receive codewords $x_0$ from the spatial stream 0. In this regard, the STBC encoder 706a and 706b may implement a 4×1 diversity transmission system. The 4×1 diversity transmission system may comprise 4 transmitting antennas and 1 spatial stream. When the switch 708 is configured to couple the output of the modulation block 704b to the input to the STBC encoder block 706b, the STBC encoder block 706b may receive codewords $x_0$ from the spatial stream 1. In this regard, the STBC encoder 706a and STBC 706b may implement a 4×2 diversity transmission system. The 4×2 diversity transmission system may comprise 4 transmitting antennas and 2 spatial streams.

Figure 8:
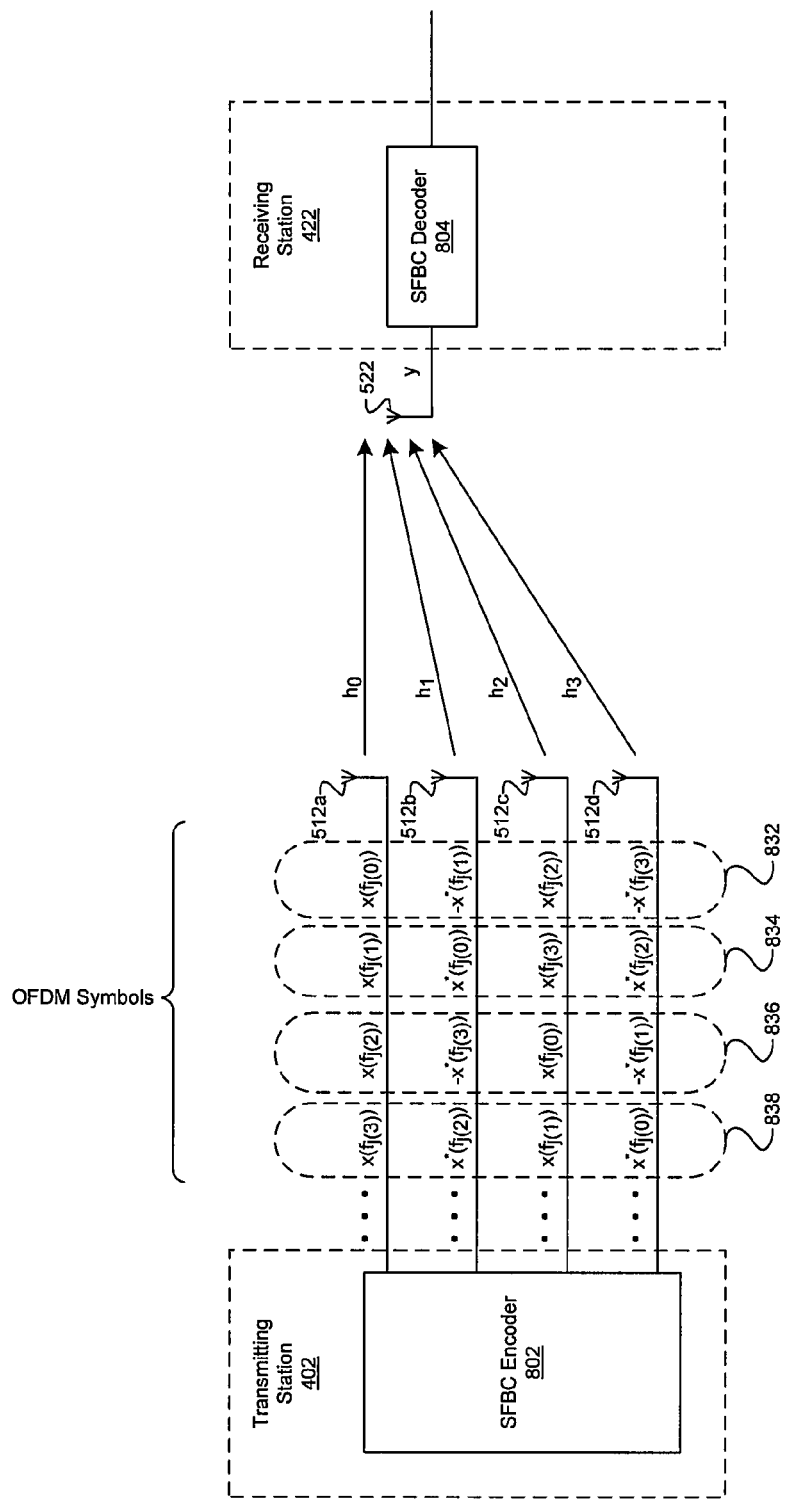
FIG. 8 is an exemplary block diagram of SFBC in a 4×1 diversity transmission system, in accordance with an embodiment of the invention.

FIG. 8 is an exemplary block diagram of SFBC in a 4×1 diversity transmission system, in accordance with an embodiment of the invention. Referring to FIG. 8, there is shown a transmitting station 402 and a receiving station 422. The transmitting station 402 may comprise an SFBC encoder 802. The transmitting station 402 may utilize diversity transmission by simultaneously transmitting a plurality of RF output signals via at least a portion of the transmitting antennas 512a, 512b, 512c and 512d. The receiving station 422 may comprise an STBC decoder 504. The receiving station 422 may receive signals via a receiving antenna 522.

When SFBC is utilized in the transmitting station in the 4×1 diversity transmission system, the STBC/SFBC block 314 may receive a plurality of OFDM symbols, $x(t_s)$, via a single spatial stream at time instants $t_s$, each of which comprises individual data symbols associated with a plurality a frequency carriers, $f_0, f_1, f_2, f_3, \ldots,$ and $f_{N_{fc}}$, for example $x(f_0)$, $x(f_1), x(f_2), x(f_3), \ldots,$ and $x(f_{N_{fc}})$, where $N_{fc}$ may represent the number of frequency carriers. The STBC/SFBC block 314 may output codewords s(i,k), where each of the transmitting antennas i may output a codeword that comprises individual data symbols associated with a tone group k. In an exemplary embodiment of the invention, each of the transmitting antennas i may be concurrently utilized to transmit codewords generated from a corresponding one of the plurality of OFDM symbols $x(t_s)$, where the i=$\mod_{N_{STS}}(t_s)$.

An exemplary codeword s(i,k) may comprise individual data symbols $x(f_{j(k)})$, or $x^*(f_{j(k)})$, where $j(k)=k, k+N_{sts}, k+2 \cdot N_{sts}, \ldots,$ $$K + \left(\left\lceil \frac{N_{fc}}{N_{sts}} \right\rceil - 1\right) \cdot N_{sts},$$

for $N_{fc}$ number of frequency carriers and $N_{sts}$ number of space time streams, for example. The set of values j(k), may be associated with a tone group, as represented by a tone group index k, where k=0, 1, 2, . . . , $N_{sts}-1$. Thus, when transmitting the codeword group 832 during a first exemplary output cycle where $N_{sts}$=4, the STBC/SFBC block 314 may output a codeword s(0,0)=$x(f_{j(0)})$ via a first space time stream, a codeword s(1,1)=$-x^*(f_{j(1)})$ via a second space time stream, a codeword s(2,2)=$x(f_{j(2)})$ via a third space time stream and a codeword s(3,3)=$-x^*(f_{j(3)})$ via a fourth space time stream. When transmitting the codeword group 834 during a second exemplary output cycle, the STBC/SFBC block 314 may output a codeword s(0,1)=$x(f_{j(1)})$ via the first space time stream, a codeword s(1,0)=$x^*(f_{j(0)})$ via the second space time stream, a codeword s(2,3)=$x(f_{j(3)})$ via the third space time stream and a codeword s(3,2)=$x^*(f_{j(3)})$ via the fourth space time stream.

When transmitting the codeword group 836 during a third exemplary output cycle where $N_{sts}$=4, the STBC/SFBC block 314 may output a codeword s(0,2)=$x(f_{j(2)})$ via the first space time stream, a codeword s(1,3)=$-x^*(f_{j(3)})$ via the second space time stream, a codeword s(2,0)=$x(f_{j(0)})$ via the third space time stream and a codeword s(3,1)=$-x^*(f_{j(1)})$ via a fourth space time stream. When transmitting the codeword group 838 during a fourth exemplary output cycle where $N_{sts}$=4, the STBC/SFBC block 314 may output a codeword s(0,3)=$x(f_{j(3)})$ via the first space time stream, a codeword s(1,2)=$x^*(f_{j(2)})$ via the second space time stream, a codeword s(2,1)=$x(f_{j(1)})$ via the third space time stream and a codeword s(3,0)=$x^*(f_{j(0)})$ via a fourth space time stream.

In various embodiments of the invention, a selected one of the transmit chains may enable transmission of a sequence of individual codewords $x(f_{j(0)})$, $x(f_{j(1)})$, in a diversity transmission system, which correspond to a sequence of individual codewords, which may be transmitted by a SISO transmission system. In the exemplary embodiment of the invention shown in FIG. 8, the transmit chain associated with the transmitting antenna 512a is utilized by the transmitting station 402 to transmit a sequence of individual codewords, which correspond to a sequence of individual codewords, which may be transmitted by a SISO transmission system. This aspect of the invention enables the transmitting station 402, which is configured as a 4×1 diversity transmission system in FIG. 8, to be reconfigured to transmit signals, which may be received by a receiving station 402 that utilizes SISO technology, by disabling the transmission of individual data symbols from the transmitting antennas 512b, 512c and 512d, for example. The transmitting station 402 shown in FIG. 8 may be reconfigured as a SISO transmission system substantially as shown in FIG. 5B. The transmitting station 402 shown in FIG. 8 may be reconfigured as a 2×1 diversity transmission system substantially as shown in FIG. 5C. The transmitting station 402 shown in FIG. 8 may be reconfigured as a 4×2 diversity transmission system substantially as shown in FIG. 6.

The sequence of codewords transmitted by the transmitting station 402 in the 4×1 diversity transmission systems shown in FIG. 5A (for STBC) and FIG. 8 (for SFBC) may be represented as a matrix, S, as shown in the following equations:

$$S = \begin{bmatrix} s(0,0) & s(0,1) & s(0,2) & s(0,3) \\ s(1,0) & s(1,1) & s(1,2) & s(1,3) \\ s(2,0) & s(2,1) & s(2,2) & s(2,3) \\ s(3,0) & s(3,1) & s(3,2) & s(3,3) \end{bmatrix} \quad [1]$$

$$= \begin{bmatrix} x(t_0) & x(t_1) & x(t_2) & x(t_3) \\ -x^*(t_1) & x^*(t_0) & -x^*(t_3) & x^*(t_2) \\ x(t_2) & x(t_3) & x(t_0) & x(t_1) \\ -x^*(t_3) & x^*(t_2) & -x^*(t_1) & x^*(t_0) \end{bmatrix}$$

for STBC where the time index k in $x(t_k)$ is represented as $\mod_{N_{sts}}(k)$, and $$S = \begin{bmatrix} s(0,0) & s(0,1) & s(0,2) & s(0,3) \\ s(1,0) & s(1,1) & s(1,2) & s(1,3) \\ s(2,0) & s(2,1) & s(2,2) & s(2,3) \\ s(3,0) & s(3,1) & s(3,2) & s(3,3) \end{bmatrix} \quad [2]$$

$$= \begin{bmatrix} x(f_{j(0)}) & x(f_{j(1)}) & x(f_{j(2)}) & x(f_{j(3)}) \\ -x^*(f_{j(1)}) & x^*(f_{j(0)}) & -x^*(f_{j(3)}) & x^*(f_{j(2)}) \\ x(f_{j(2)}) & x(f_{j(3)}) & x(f_{j(0)}) & x(f_{j(1)}) \\ -x^*(f_{j(3)}) & x^*(f_{j(2)}) & -x^*(f_{j(1)}) & x^*(f_{j(0)}) \end{bmatrix}$$

for SFBC. The signal vector Y, received at the receiving station 422, for example, may be represented for STBC as in the following equation:

$$Y = \begin{bmatrix} y_0 \\ y_1 \\ y_2 \\ y_3 \end{bmatrix} \quad [3]$$

$$= [h_0 \; h_1 \; h_2 \; h_3] \begin{bmatrix} x(t_0) & x(t_1) & x(t_2) & x(t_3) \\ -x^*(t_1) & x^*(t_0) & -x^*(t_3) & x^*(t_2) \\ x(t_2) & x(t_3) & x(t_0) & x(t_1) \\ -x^*(t_3) & x^*(t_2) & -x^*(t_1) & x^*(t_0) \end{bmatrix} + \begin{bmatrix} n_0 \\ n_1 \\ n_2 \\ n_3 \end{bmatrix}$$

where the values $n_i$ represent signal noise.

The signal vector Y received at the receiving station 422 may also be represented as shown in the following equation:

$$\begin{bmatrix} y_0 \\ y_1^* \\ y_2 \\ y_3^* \end{bmatrix} = \begin{bmatrix} h_0 & -h_1 & h_2 & -h_3 \\ h_1^* & h_0^* & h_3^* & h_2^* \\ h_2 & -h_3 & h_0 & -h_1 \\ h_3^* & h_2^* & h_1^* & h_0^* \end{bmatrix} \begin{bmatrix} x(t_0) \\ x^*(t_1) \\ x(t_2) \\ x^*(t_3) \end{bmatrix} + \begin{bmatrix} n_0 \\ n_1 \\ n_2 \\ n_3 \end{bmatrix} \quad [4]$$

The first term on the right hand side of equation [4] represents an effective transfer function matrix, $H_{\textit{eff}}$. The second term on the right hand side of equation [4] represents an original sequence, X, transmitted in the form of 4×4 block codewords, S, in order to exploit the transmit diversity gain. The left hand side of equation [4] represents the received signal $y_i$ at each time instant i. The equation [4] is a representation of the signals S, as shown in equation [1], which are transmitted by the plurality of transmitting antennas across a range of time instants.

With quasi-orthogonal STBC/SFBC, the values of the coefficients in the transfer matrix $H_{\textit{eff}}$ may display identifiable patterns. In a 4×1 diversity transmission system, which utilizes quasi-orthogonal STBC or SFBC, the codewords may be transmitted by the transmitting station 402 in such a pattern that the effective transfer function matrix, $H_{\textit{eff}}$, may represented by an ABBA pattern, for example, where A and B are as shown in the following equations:

$$A = \begin{bmatrix} h_0 & -h_1 \\ h_1^* & h_0^* \end{bmatrix} \quad [5a]$$

$$B = \begin{bmatrix} h_2 & -h_3 \\ h_3^* & h_2^* \end{bmatrix} \quad [5b]$$

the matrix $H_{\textit{eff}}$ shown in equation [4] may be represented as:

$$H_{\textit{eff}} = \begin{bmatrix} A & B \\ B & A \end{bmatrix} \quad [6]$$

In an exemplary SISO transmission configuration as shown in FIG. 5B, the transmitting station 402 may be configured to disable transmission of signals by the transmitting antennas 512b, 512c and 512d. In this case, the equation [4] may be represented as in the following equation:

$$\begin{bmatrix} y_0 \\ y_1^* \\ y_2 \\ y_3^* \end{bmatrix} = \begin{bmatrix} h_0 & 0 & 0 & 0 \\ 0 & h_0^* & 0 & 0 \\ 0 & 0 & h_0 & 0 \\ 0 & 0 & 0 & h_0^* \end{bmatrix} \begin{bmatrix} x(t_0) \\ x^*(t_1) \\ x(t_2) \\ x^*(t_3) \end{bmatrix} + \begin{bmatrix} n_0 \\ n_1 \\ n_2 \\ n_3 \end{bmatrix} \quad [7]$$

from which the receiving station 422 may receive signals $y_k$, which may be represented as shown in the following equation:

$$y_k = h_0 x(t_k) + n_k \quad [8]$$

which may correspond to SISO reception.

In an exemplary 2×1 diversity transmission configuration as shown in FIG. 5C, the transmitting station 402 may be configured to disable transmission of signals by the transmitting antennas 512c and 512d. In this case, the equation [4] may be represented as in the following equation:

$$\begin{bmatrix} y_0 \\ y_1^* \\ y_2 \\ y_3^* \end{bmatrix} = \begin{bmatrix} h_0 & -h_1 & 0 & 0 \\ h_1^* & h_0^* & 0 & 0 \\ 0 & 0 & h_0 & -h_1 \\ 0 & 0 & h_1^* & h_0^* \end{bmatrix} \begin{bmatrix} x(t_0) \\ x^*(t_1) \\ x(t_2) \\ x^*(t_3) \end{bmatrix} + \begin{bmatrix} n_0 \\ n_1 \\ n_2 \\ n_3 \end{bmatrix} \quad [9]$$

The STBC decoder 506 in the receiving station 422 may process the received signal vector Y by computing a matrix product $H_{\textit{eff}}^+ \times Y$ (where $H^+$ represents the complex conjugate transform, or Hermitian transform, of the matrix H) as shown in the following equation:

$$\begin{bmatrix} h_0^* & h_1 & 0 & 0 \\ -h_1^* & h_0 & 0 & 0 \\ 0 & 0 & h_0^* & h_1 \\ 0 & 0 & -h_1^* & h_0 \end{bmatrix} \begin{bmatrix} y_0 \\ y_1^* \\ y_2 \\ y_3^* \end{bmatrix} = \quad [10]$$

$$\begin{bmatrix} |h_0|^2+|h_1|^2 & 0 & 0 & 0 \\ 0 & |h_0|^2+|h_1|^2 & 0 & 0 \\ 0 & 0 & |h_0|^2+|h_1|^2 & 0 \\ 0 & 0 & 0 & |h_0|^2+|h_1|^2 \end{bmatrix} \begin{bmatrix} x(t_0) \\ x^*(t_1) \\ x(t_2) \\ x^*(t_3) \end{bmatrix} +$$

$$\begin{bmatrix} h_0^* & h_1 & 0 & 0 \\ -h_1^* & h_0 & 0 & 0 \\ 0 & 0 & h_0^* & h_1 \\ 0 & 0 & -h_1^* & h_0 \end{bmatrix} \begin{bmatrix} n_0 \\ n_1 \\ n_2 \\ n_3 \end{bmatrix}$$

where the matrix product $H_{\textit{eff}}^+ \times H_{\textit{eff}}$ represents a square matrix $H_{sq}$ as shown in the following equation:

$$H_{sq} = \begin{bmatrix} |h_0|^2 + |h_1|^2 & 0 & 0 & 0 \\ 0 & |h_0|^2 + |h_1|^2 & 0 & 0 \\ 0 & 0 & |h_0|^2 + |h_1|^2 & 0 \\ 0 & 0 & 0 & |h_0|^2 + |h_1|^2 \end{bmatrix} \quad [11]$$

While the matrix $H_{sq}$ is shown as a diagonal matrix in equation [10], in various embodiments of the invention, such as in a 3×1 diversity transmission system, for example, the matrix $H_{sq}$ may contain nonzero off-diagonal matrix elements. These nonzero off-diagonal matrix elements may correspond to crosstalk signals received at the receiving station 422. In various embodiments of the invention, selected codewords in the codeword sequence S shown in equation [1] may be rotated by a computed angle rotation value such that a diagonal matrix $H_{sq}$ may also be determined for a 3×1 diversity transmission system. The angle rotation may consequently cancel the crosstalk signals. A method and system for angle rotation for crosstalk cancellation is disclosed in U.S. patent application Ser. No. 11/759,203, filed on Jun. 6, 2007, which is hereby incorporated herein by reference in its entirety.

In an alternative exemplary 2×1 diversity transmission system the transmitting station 402 may be configured to disable transmission of signals by the transmitting antennas 512b and 512c. In this case, the equation [4] may be represented as in the following equation:

$$\begin{bmatrix} y_0 \\ y_1^* \\ y_2 \\ y_3^* \end{bmatrix} = \begin{bmatrix} h_0 & 0 & 0 & -h_3 \\ 0 & h_0^* & h_3^* & 0 \\ 0 & -h_3 & h_0 & 0 \\ h_3^* & 0 & 0 & h_0^* \end{bmatrix} \begin{bmatrix} x(t_0) \\ x^*(t_1) \\ x(t_2) \\ x^*(t_3) \end{bmatrix} + \begin{bmatrix} n_0 \\ n_1 \\ n_2 \\ n_3 \end{bmatrix} \quad [12]$$

for which the matrix $H_{sq}$ may be represented as in the following equation:

$$H_{sq} = \begin{bmatrix} |h_0|^2 + |h_3|^2 & 0 & 0 & 0 \\ 0 & |h_0|^2 + |h_3|^2 & 0 & 0 \\ 0 & 0 & |h_0|^2 + |h_3|^2 & 0 \\ 0 & 0 & 0 & |h_0|^2 + |h_3|^2 \end{bmatrix} \quad [13]$$

In various embodiments of the invention, the methods disclosed in equations [3]-[11] may be substantially utilized in a diversity transmission system that utilizes SFBC. Furthermore, various embodiments of the invention may not be limited to the case where $H_{\mathit{eff}}$ is represented by an ABBA pattern. Various aspects of the invention may also be practiced for other $H_{\mathit{eff}}$ patterns, such as the AB(−B*)A, for example.

Figure 9:
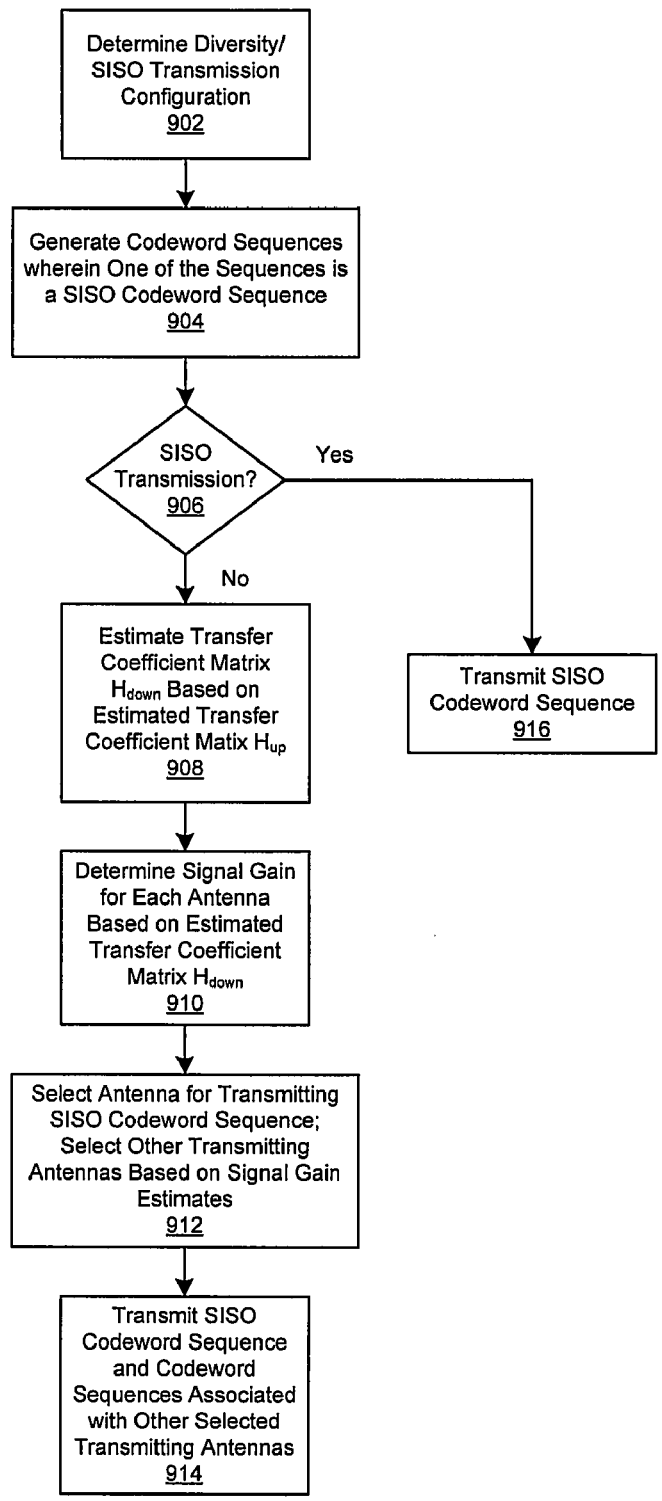
FIG. 9 is a flowchart illustrating exemplary steps for reconfigurable SFBC/STBC in a diversity transmission system, in accordance with an embodiment of the invention.

FIG. 9 is a flowchart illustrating exemplary steps for reconfigurable SFBC/STBC in a diversity transmission system, in accordance with an embodiment of the invention. The exemplary flowchart in FIG. 9 illustrates steps for a transmitting station 402, which may be reconfigured without utilizing feedback information from the receiving station 422. Referring to FIG. 9, in step 902, the transmitting station 402 may determine a diversity transmission or SISO transmission configuration. In step 904, the transmitting station 402 may generate codeword sequences. Each codeword sequence may correspond to a sequence of codewords transmitted via a single transmitting antenna. One of the codeword sequences may correspond to a SISO codeword sequence. Step 906 may determine whether the transmission configuration is a SISO transmission configuration or a diversity transmission configuration. When the transmitting station 402 utilizes a SISO transmission configuration, in step 916, the transmitting station 402 may transmit the SISO codeword sequence via a single transmitting antenna.

When the transmitting station 402 utilizes diversity transmission, in step 908, the transmitting station 402 may compute an estimated transfer coefficient matrix $H_{down}$, which corresponds to one or more propagation paths in the downlink direction from the AP 102 to a WLAN station 104, for example. Coefficients within the matrix $H_{down}$ may be determined based on signals $Y_f$ received from the receiving station 422.

In step 910, the transmitting station 402 may determine a signal gain measure corresponding to each of the transmitting antennas. The signal gain determinations may be based on coefficient values within the matrix $H_{down}$. In step 912, transmitting antennas may be selected based on the signal gain estimates. In step 914, the SISO codeword sequence may be transmitted in addition to codewords associated with other selected transmitting antennas.

Figure 10:
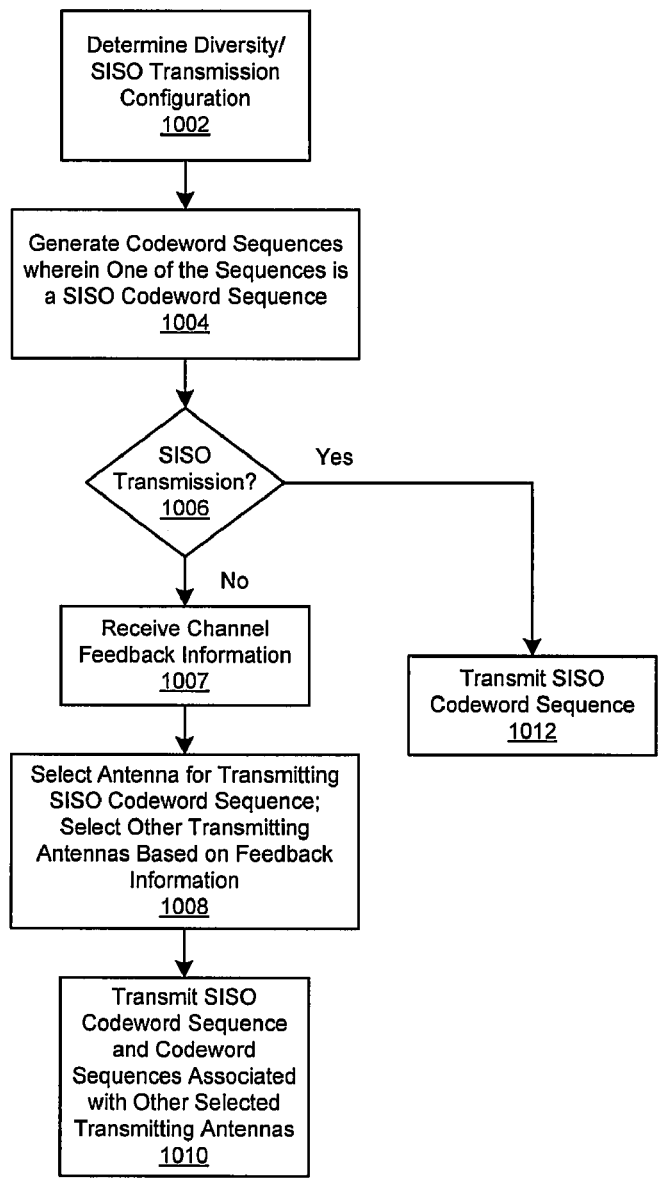
FIG. 10 is a flowchart illustrating exemplary steps for reconfigurable SFBC/STBC in a diversity transmission system based on feedback information, in accordance with an embodiment of the invention.

FIG. 10 is a flowchart illustrating exemplary steps for reconfigurable SFBC/STBC in a diversity transmission system based on feedback information, in accordance with an embodiment of the invention. Referring to FIG. 10, in step 1002, the transmitting station 402 may determine a diversity transmission or SISO transmission configuration. In step 1004, the transmitting station 402 may generate codeword sequences. Each codeword sequence may correspond to a sequence of codewords transmitted via a single transmitting antenna. One of the codeword sequences may correspond to a SISO codeword sequence. Step 1006 may determine whether the transmission configuration is a SISO transmission configuration or a diversity transmission configuration. When the transmitting station 402 utilizes a SISO transmission configuration, in step 1012, the transmitting station 402 may transmit the SISO codeword sequence via a single transmitting antenna.

When the transmitting station 402 utilizes diversity transmission, in step 1007, the transmitting station 402 may receive channel feedback information from the receiving station 422. In step 1008, the transmitting station 402 may select transmitting antennas based on the channel feedback information. In various embodiments of the invention, the channel feedback information may comprise at least a portion of coefficients from a transfer coefficient matrix $H_{down}$ computed at the receiving station 422. The feedback information may comprise diversity configuration information, which may be communicated from the receiving station 422 to the transmitting station 402 via the channel feedback information. In step 1010, the SISO codeword sequence may be transmitted in addition to codewords associated with other selected transmitting antennas.

Figure 11:
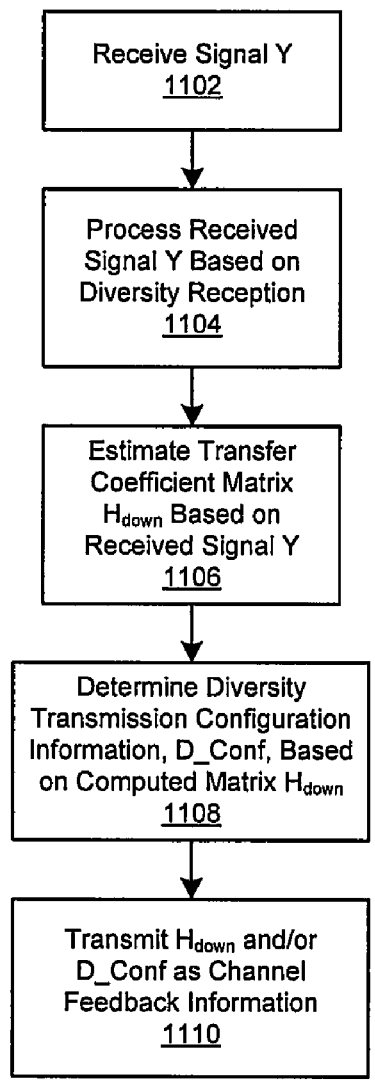
FIG. 11 is a flowchart illustrating exemplary steps for generation of channel feedback information for reconfigurable SFBC/STBC in a diversity transmission system, in accordance with an embodiment of the invention.

FIG. 11 is a flowchart illustrating exemplary steps for generation of channel feedback information for reconfigurable SFBC/STBC in a diversity transmission system, in accordance with an embodiment of the invention. Referring to FIG. 11, in step 1102, the receiving station 422 may receive signals Y from the transmitting station 402. In step 1104, the receiving station 422 may process the received signal utilizing diversity reception. In various embodiments of the invention, the diversity reception may be based on STBC and/or SFBC. In step 1106, the receiving station may estimate coefficient values for a transfer coefficient matrix $H_{down}$ based on the received signal Y. In step 1108, the receiving station 422 may determine diversity transmission configuration information, D_Conf, based on the computed transfer coefficient matrix $H_{down}$. In step 1110, the receiving station 422 may transmit the matrix $H_{down}$ and/or D_Conf information to the transmitting station 402 in channel feedback information.

Aspects of a method and system for reconfigurable SFBC/STBC in a diversity transmission system may include an STBC encoder 502 that enables generation of a plurality of codeword sequences based on a data sequence. In a diversity transmission system, the plurality of codeword sequences may be concurrently transmitted via at least a portion of a plurality of transmitting antennas 512a, 512b, 512c and 512d. The concurrently transmitted codeword sequences may enable a diversity receiver 422 to generate the data sequence. The transmitting station 402 may be reconfigured to utilize a single transmitting antenna 512a to enable communication in a single input single output communications system. In a single input single output transmission system, the STBC encoder 502 may enable transmission of one of the plurality of codeword sequences via one of the plurality of transmitting antennas. The transmitted codeword sequence may enable a receiver 520 to generate the data sequence.

The codeword sequences may be concurrently transmitted via selected transmitting antennas. The transmitting antennas may be selected based on feedback information received from the diversity receiver 422. The feedback information may comprise an indication received signal strength as measured at the receiver, or an antenna selection indication, dconf. The received signal strength indication may be determined based on values of transfer function coefficients, h, evaluated at the diversity receiver 422.

The data sequence may comprise a plurality of data symbols. Each of the plurality of codeword sequences may comprise a plurality of codewords s(i,k). In an STBC diversity transmission system, each of the plurality of codewords may correspond to one of the data symbols. In an SFBC diversity transmission system, each of the codeword sequences may correspond to one of the data symbols.

The plurality of codeword sequences may be generated based on an original data sequence, X, and a computed matrix $H_{eff}$. The computed matrix may be determined based on transfer function coefficients, h, associated with each of the propagation paths for signals transmitted by the transmitting antennas.

Another embodiment of the invention may provide a machine-readable storage, having stored thereon, a computer program having at least one code section executable by a machine, thereby causing the machine to perform the steps as described herein for reconfigurable SFBC/STBC in a diversity transmission system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
   generating a plurality of codeword sequences at a diversity transmitter based on a data sequence;
   concurrently transmitting, at said diversity transmitter, said plurality of codeword sequences via at least a portion of a plurality of transmitting antennas, wherein said concurrently transmitted plurality of codeword sequences enables a diversity receiver to regenerate said data sequence; and
   reconfiguring said diversity transmitter to utilize one of said plurality of transmitting antennas to transmit one of said plurality of codeword sequences that enables a receiver to regenerate said data sequence.

2. The method according to claim 1, comprising concurrently transmitting said plurality of codeword sequences via selected ones of said plurality of transmitting antennas.

3. The method according to claim 2, comprising choosing said selected ones of said plurality of transmitting antennas based on feedback information from said diversity receiver.

4. The method according to claim 3, wherein said feedback information comprises an indication of received signal strength at said diversity receiver and/or an antenna selection indication.

5. The method according to claim 1, wherein said data sequence comprises a plurality of data symbols.

6. The method according to claim 5, wherein each of said plurality of codeword sequences, generated based on said data sequence, comprises a plurality of codewords.

7. The method according to claim 6, wherein each of said plurality of codewords corresponds to one of said plurality of data symbols.

8. The method according to claim 6, wherein each of said plurality of codeword sequences corresponds to one of said plurality of data symbols.

9. The method according to claim 1, comprising generating said plurality of codeword sequences based on an original data sequence and a computed matrix.

10. The method according to claim 9, wherein said computed matrix is determined based on transfer function coefficients associated with signals transmitted via said plurality of transmitting antennas.

11. A system for processing signals in a communication system, the system comprising:
   one or more circuits that enable generation, of a plurality of codeword sequences at a diversity transmitter based on a data sequence;
   said one or more circuits enable concurrent transmission, at said diversity transmitter, of said plurality of codeword sequences via at least a portion of said plurality of transmitting antennas, wherein said concurrently transmitted plurality of codeword sequences enables a diversity receiver to regenerate said data sequence; and said one or more circuits enable reconfiguration of said diversity transmitter to utilize one of said plurality of transmitting antennas; and said one or more circuits enable reconfiguration of said diversity transmitter to utilize one of said plurality of transmitting antennas to transmit one of said plurality of codeword sequences that enables a receiver to regenerate said data sequence.

12. The system according to claim 11, wherein said one or more circuits enable concurrent transmission of said plurality of codeword sequences via selected ones of said plurality of transmitting antennas.

13. The system according to claim 12, wherein said one or more circuits enable choice of said selected ones of said plurality of transmitting antennas based on feedback information from said diversity receiver.

14. The system according to claim 13, wherein said feedback information comprises an indication of received signal strength at said diversity receiver and/or an antenna selection indication.

15. The system according to claim 11, wherein said data sequence comprises a plurality of data symbols.

16. The system according to claim 15, wherein each of said plurality of codeword sequences, generated based on said data sequence, comprises a plurality of codewords.

17. The system according to claim 16, wherein each of said plurality of codewords corresponds to one of said plurality of data symbols.

18. The system according to claim 16, wherein each of said plurality of codeword sequences corresponds to one of said plurality of data symbols.

19. The system according to claim 11, wherein said one or more circuits enables generation of said plurality of codeword sequences based on an original data sequence and a computed matrix.

20. The system according to claim 19, wherein said computed matrix is determined based on transfer function coefficients associated with signals transmitted via said plurality of transmitting antennas.

21. The system according to claim 11, wherein said one or more circuits comprise a space-time block coding (STBC) encoder, a space-frequency block coding (SFBC) encoder, an STBC decoder, an SFBC decoder and a single input single output (SISO) decoder.

* * * * *